United States Patent [19]
Ohshita et al.

[11] Patent Number: 5,138,982
[45] Date of Patent: Aug. 18, 1992

[54] INTERNAL CIRCULATING FLUIDIZED BED TYPE BOILER AND METHOD OF CONTROLLING THE SAME

[75] Inventors: Takahiro Ohshita; Tsutomu Higo; Shigeru Kosugi, all of Kanagawa; Naoki Inumaru, Tokyo; Hajime Kawaguchi, Kanagawa, all of Japan

[73] Assignee: Ebara Corporation, Tokyo, Japan

[21] Appl. No.: 760,858

[22] PCT Filed: Jul. 20, 1987

[86] PCT No.: PCT/JP87/00530
§ 371 Date: Jan. 4, 1990
§ 102(e) Date: Jan. 4, 1990

[87] PCT Pub. No.: WO89/00659
PCT Pub. Date: Jan. 26, 1989

Related U.S. Application Data

[63] Continuation of Ser. No. 455,322, Jan. 4, 1991, abandoned, which is a continuation-in-part of Ser. No. 224,273, Jul. 26, 1988, Pat. No. 4,823,740, which is a continuation of Ser. No. 6,066, Jan. 21, 1987, abandoned.

[51] Int. Cl.$^5$ .............................. B09B 3/00; F22B 1/00
[52] U.S. Cl. .................................... 122/4 D; 110/245; 165/104.16
[58] Field of Search ....................... 122/4 D; 110/245; 165/104.16; 422/146

[56] References Cited

U.S. PATENT DOCUMENTS 3,702,595 11/1972 Muirhead et al. .
3,881,857 5/1975 Hoy et al. .
3,921,590 11/1975 Mitchell et al. .
(List continued on next page.)

FOREIGN PATENT DOCUMENTS 0056851 8/1982 European Pat. Off. .
0078706 5/1983 European Pat. Off. .
(List continued on next page.)

OTHER PUBLICATIONS

7th International Conference on Fluidized Bed Combustion-vol. 1, Jan. 83, "The Control of Industrial Fluidized Bed Boiler Plant", Michael J. Virr, pp. 350-359.
"A Novel In-Bed Heat Transfer Tube Capable of Decreasing $h_w$ Linearly With Load Turndown", Horio et al., pp. 655-663.
"Fluidization Engineering", Kunii et al., pp. 272-277.
Power Technology, 19 (Jun. 1978), pp. 197-203, "Bed to Surface Heat Transfer In A Fluidized Bed of Large Particles", Deloye et al.

*Primary Examiner*—Edward G. Favors
*Attorney, Agent, or Firm*—Wenderoth, Lind & Ponack

[57] ABSTRACT

An internal recycling type fluidized bed boiler includes a primary fluidized bed incinerating chamber constructed by an air diffusion plate, and an inclined partition wall provided above a portion of the diffusion plate where the mass flow of the air injected from the diffusion plate is greater than that from another portion so as to interfere with the upward flow of the fluidizing air injected from that portion and deflect it towards the portion above the diffusion plate where the mass flow of gas injected is smaller. A thermal energy recovery chamber is formed between the inclined partition wall and a side wall of an incinerator. The inclined partition wall is inclined by 10°-60° relative to the horizontal and is arranged such that the length of its projection in the horizontal direction is 1/6-½ of the horizontal length of the bottom of the incinerator bottom. A method of controlling the above fluidized bed boiler with respect to the amount of thermal energy recovered from the thermal energy recovery chamber includes regulating the amount of air injected from a diffuser in the thermal energy recover chamber, based on demands from the user side utilizing the recovered thermal energy. The amount of fuel to the primary fluidized bed incinerating chamber is controlled based on the temperature in the primary fluidized bed incinerating chamber.

34 Claims, 19 Drawing Sheets

U.S. PATENT DOCUMENTS

| | | |
|---|---|---|
| 3,970,011 | 7/1976 | Virr et al. . |
| 4,279,222 | 7/1981 | Pearce . |
| 4,301,771 | 11/1981 | Jukkola et al. . |
| 4,338,887 | 7/1982 | Leon . |
| 4,363,292 | 12/1982 | Engstrom . |
| 4,419,330 | 12/1983 | Ishihara et al. . |
| 4,452,155 | 6/1984 | Ishihara et al. . |
| 4,457,289 | 7/1984 | Korenberg . |
| 4,528,945 | 7/1985 | Virr et al. . |
| 4,619,314 | 10/1986 | Shimoda . |
| 4,938,170 | 7/1990 | Ohshita et al. .................... 122/4 D |

FOREIGN PATENT DOCUMENTS

| | | |
|---|---|---|
| 0092622 | 11/1983 | European Pat. Off. . |
| 0154717 | 9/1985 | European Pat. Off. . |
| 2104485 | 8/1971 | Fed. Rep. of Germany . |
| 3417445 | 11/1985 | Fed. Rep. of Germany . |
| 2197176 | 3/1974 | France . |
| 49-95470 | 9/1974 | Japan . |
| 51-46988 | 12/1976 | Japan . |
| 55-118515 | 9/1980 | Japan . |
| 55-165416 | 12/1980 | Japan . |
| 57-41501 | 3/1982 | Japan . |
| 57-124608 | 8/1982 | Japan . |
| 57-127716 | 8/1982 | Japan . |
| 62-213601 | 9/1987 | Japan . |
| 1299125 | 12/1972 | United Kingdom . |
| 1522601 | 8/1978 | United Kingdom . |
| 1577717 | 10/1980 | United Kingdom . |
| 1604314 | 12/1981 | United Kingdom . |
| 2079620 | 1/1982 | United Kingdom . |

Fig. 5

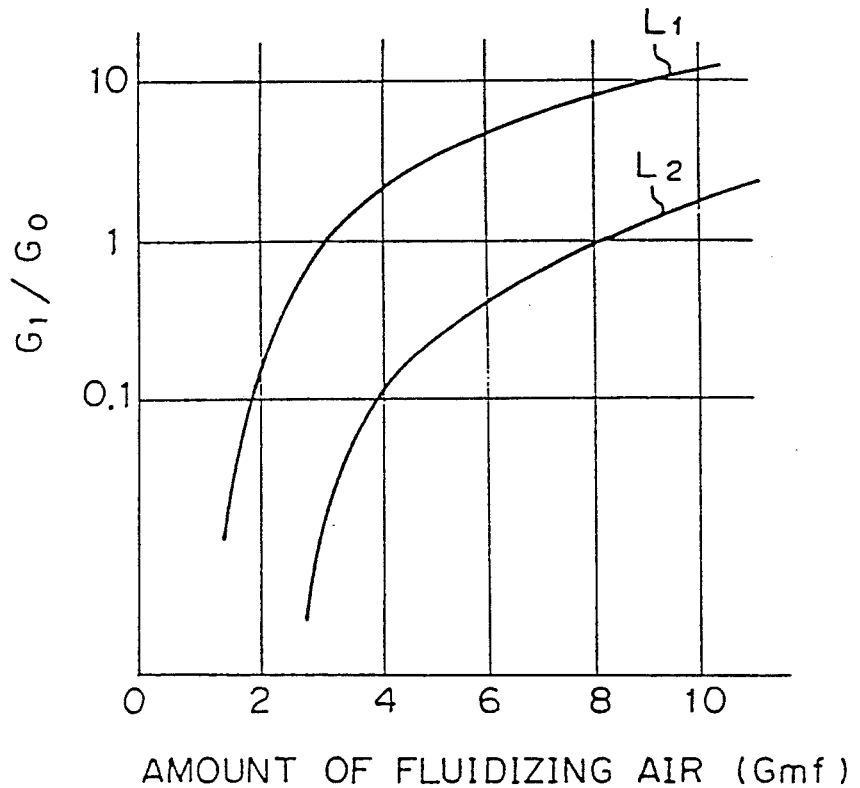

NOTE
- $G_{mf}$ MINIMUM MASS FLOW FOR FLUIDIZATION
- $G_1$ RECYCLING AMOUNT OF FLUIDIZING MEIUM
- $L_1$ THE CASE WHERE HEIGHT OF FLUIDIZED BED REACHES UPPER END OF INCLINED PARTITION WALL WITHOUT INJECTING FLUIDIZING AIR INTO BED
- $L_2$ THE CASE WHERE HEIGHT OF FLUIDIZED BED IN INCINERATING PORTION IS APPROXIMATELY AT UPPER END OF PARTITION WALL WITH INJECTING FLUIDIZING AIR INTO BED
- $G_0$ RECYCLING AMOUNT OF FLUIDIZING MEDIUM IN CASE OF $L_1$ WITH FLUIDIZING AIR MASS FLOW AT LOWER END OF INCLINED PARTITION WALL $3G_{mf}$ IN INCINERATING CHAMBER

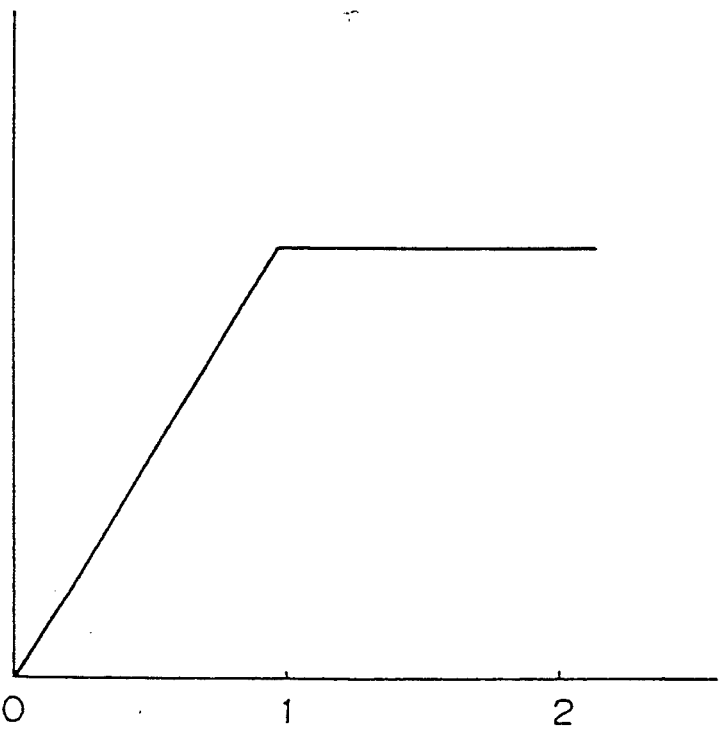

$$\frac{1}{6} \leq \frac{\ell}{L} \leq \frac{1}{2}$$

$$\frac{l}{L} > \frac{1}{2}$$

$$\frac{\ell}{L} < \frac{1}{6}$$

INTERNAL CIRCULATING FLUIDIZED BED TYPE BOILER AND METHOD OF CONTROLLING THE SAME

This application is a continuation of now abandoned application, Ser. No. 07/455,322, filed Jan. 4, 1991, which is a continuation-in-part of application Ser. No. 07/224,273, filed Jul. 26, 1988, now U.S. Pat. No. 4,823,740, which is a continuation of application Ser. No. 07/006,066, filed Jan. 21, 1987, now abandoned.

TECHNICAL FIELD

The present invention relates to an apparatus for incinerating coal, anthracite, coal dressing sludge, petro coke, bark, bagasse, industrial waste, municipal waste and other combustibles by using a so-called circulating type fluidized bed as well as for recovering thermal energy from the fluidized bed, and a method of controlling the amount of diffusion gas to be blown into a thermal energy recovery chamber and the amount of fuel to be supplied in order to regulate the amount of thermal energy recovered and to maintain a constant temperature in the primary incinerating chamber of the fluidized bed.

PRIOR ART

Heretofore, as a circulating fluidized bed type incinerator, such ones as those disclosed in Japanese Patent Publication Nos. 46988/76 and 5242/68 have been known.

One example of the above-mentioned circulating type fluidized bed incinerator will be explained by referring to FIG. 1.

A diffusion plate 2 is provided at a furnace bottom of an incinerator 1 for the purpose of causing fluidization of a fluidizing medium. The diffusion plate 2 is inclined so that the wall side provided with a waste feeding device 3 is higher than the opposite side, the lower portion of the opposite side being coupled with an incombustible discharge opening 4.

Fluidizing air fed from a blower 8 is blown upwardly from the diffusion plate 2 through air chambers 5, 6 and 7 to fluidize the fluidizing medium.

The mass flow of the fluidizing air blown up from each of the air chambers is arranged to be sufficient to produce a fluidized bed, the flow blown up from the chamber 7 being the largest and that from the chamber 5 being the smallest.

For example, the mass flow is selected from the following ranges, namely, that blown up from the air chamber 7 being in the range of 4–20 Gmf, or preferably 6–12 Gmf, that from the air chamber 6 being in the range of 3–10 Gmf, or preferably 4–6 Gmf, and that from the chamber 5 being in the range of 1–4 Gmf, preferably 1–2.5 Gmf.

1 Gmf is a value of the mass flow at which the fluidization is commenced.

The state of the fluidizing medium is changed from a static state, which is referred to as a static bed, to a dynamic state, which is referred to as a fluidized bed, with the above value as a threshold between the two states.

While the example shown in FIG. 1 shows three air chambers, the number is optional and may, for example, be two or more than three chambers, and the mass flow of the fluidizing air is arranged to be large for the chamber near the discharge opening 4 and small for the chamber remote from the discharge opening.

Just above the air chambers 7 and 6, an inclined wall 9 is provided to serve as a deflecting wall for interrupting passage of the upward flowing fluidizing air so as to deflect the air towards the combustible feeding device 3.

At the upper side of the inclined wall 9, an inclined surface 10 whose inclination is opposite to that of the wall 9 is provided to prevent the fluidizing medium from becoming piled up thereon.

The inclination of the diffusion plate 2 is, in the case where the incombustibles are contained in the combustibles to be charged, preferably in the range of 5°–15°; however, in the case where the amount of incombustibles is small, the inclination may be nil and the plate may be horizontal since the fluidizing medium can be put into circulation by adjusting the flow rate of the air blown from the respective air chambers.

The surface of the wall 9 may be either flat, convex or concave. At a ceiling 11 of the incinerator, a combustion gas exhaust 12, a feed conduit 13 for feeding liquid waste generated upon operating the incinerator, and a cooling water feeding conduit 14 etc. are provided.

As to the operation of the incinerator 1, the fluidizing air is fed thereinto by the blower 8 and the fluidizing air is injected in regulated amounts of mass flow decreasing in the order of the chambers 7, 6 and 5.

In the conventional fluidized bed, the fluidizing medium moves violently up-and-down, just like boiling water, to produce a fluidizing state. However, the fluidizing medium at the portion near the side wall provided with the combustible feeding device 3 does not move violently up-and-down and forms a moving bed 15 which experiences weak fluidization. The width of the moving bed is narrow at the upper portion thereof and is spread at the lower portion due to the difference in the mass flow of the air injected from the respective air chambers. That is, the trailing end of the moving bed extends above the air chamber 6 or 7 and, thus, the fluidizing medium is blown upwardly by the large mass flow from these chambers so as to be displaced therefrom, whereby a part of the moving bed 15 above the air chamber 5 descends by gravity. With such downward movement of the bed 15, the fluidizing medium is supplemented from the fluidized bed accompanying a circulating flow 16 towards the upper portion of the bed 15 and with the repetition of the above, as a whole, the circulating fluidized bed is formed.

The fluidizing medium moved above the air chambers 6 and 7 is blown upwardly against the inclined wall 9 where it is deflected and whirled towards the side wall having the combustible feeding device, descending gradually after it reaches the upper portion of the moving bed 15, and is then blown up again to circulate after it reaches the trailing end.

The combustibles fed from the feeding device 3 to the top of the moving bed 15 in the incinerator 1 under the state just explained are entrained within the descending moving bed 15 and move downwards.

In the conventional fluidized bed, such combustibles as paper that is light in weight and high in exothermic energy are merely incinerated on the surface of the fluidized bed without greatly contributing to heating the fluidizing medium; however, such wasting is prevented in the circulating type fluidized bed and such combustibles are incinerated with certainty within the descending moving bed 15 and the circulating fluidized bed 16, thereby enabling such combustibles to effectively heat the fluidizing medium.

The incombustibles charged together with the combustibles firstly descend within the descending moving bed 15 and thence move in the lateral direction and, during such movement, the combustibles attached to or unitarily incorporated in the incombustibles (for example, the coatings on electric wires) are incinerated. The incombustibles reaching the trailing end are delivered to the incombustible discharge opening 4 due to the lateral movement of the fluidizing medium and the inclination of the air diffusion plate 2, pass through a vertical passage 17 and an incombustible discharge conveyor 18, and are discharged outwardly after the fluidizing medium is sorted by means of a vibrating sieve 19.

The sorted fluidizing medium or fresh fluidizing medium is fed to the incinerator 1 by a transporting means 20 such as an elevator.

Next, another example of the conventional circulating fluidized bed type incinerator is explained by referring to FIG. 2.

As shown in FIG. 2, at the internal bottom portion of the incinerator, a diffusion plate 22 for the fluidizing air is provided. The opposite edge portions of the air diffusion plate 22 are arranged to be lower than the central portion and the diffusion plate is formed to represent the configuration of a hill (a chevron shape) in section approximately symmetrical about the center line 42 of the incinerator and an incombustible discharge opening 24 is coupled to each of the opposite edge portions.

The fluidizing air fed from a blower 28 is injected upwardly from the air diffusion plate 22 through air chambers 25, 26 and 27. The mass flow of the fluidizing air injected from each of the air chambers 25 and 27 at the opposite edge portions is large enough to form the fluidized bed but the mass flow injected from the central air chamber 26 is made smaller than that from the former.

For example, the mass flow for the fluidizing air injected from the air chambers 25 and 27 is selected to be in the range of 4–20 Gmf, preferably in the range of 6–12 Gmf, while the mass flow for the fluidizing air injected from the air chamber 26 is selected to be in the range of 0.5–3 Gmf, preferably in the range of 1–2.5 Gmf.

The number of air chambers is optionally determined as three or more. In a case where the number is more than three, the mass flow of the fluidizing air is arranged to be small at the chambers near the central portion and large at the chambers near the opposite edge portions.

Just above the air chambers 25 and 27 at the opposite edge portions, inclined walls 29 are provided as deflecting walls to interfere with and deflect the fluidizing air towards the center of the incinerator.

Above the inclined walls 29, inclined surfaces 30 each having an inclination opposite to that of the walls 29 are provided so as to prevent the fluidizing medium from piling up.

The inclination of the diffusion plate 22 is preferably in the order of 5°–15° in the case where the combustibles are accompanied by incombustibles.

It need not be given an inclination in the case where no incombustibles are contained within the combustibles.

The surface of the inclined walls 29 may be either flat, convex or concave.

At a ceiling portion 31 within the incinerator, a combustible charge opening 34 communicating with an outlet 33 of a combustible feeding device 23 is provided in opposing relation to the central air chamber 26 and an exhaust gas discharge portion 32 is also provided.

The inclined wall 29 may be constructed as a wall body constituted by metallic conduits through which the fluidizing air is passed so as to be pre-heated.

As to the operation of this incinerator, the fluidizing air is fed thereinto by a blower 28 and it is injected at a large mass flow from the air chambers 25 and 27 and at a small mass flow from the air chamber 26.

In the conventional fluidized bed, the fluidizing medium moves up-and-down violently in a manner similar to boiling water to form the fluidizing state; however in the case of FIG. 2, the fluidizing medium above the air chamber 26 does not produce this violent up-and-down motion and forms a moving bed in a state of weak fluidization. The width of this moving bed is narrow at the upper portion thereof and spreads out laterally at the trailing ends in opposite directions towards the portions of the fluidized beds, and a part of the moving bed reaching above the air chambers 25 and 27 is blown upwardly where the fluidizing medium is subjected to injection of the fluidizing air at the large mass flow. Thus a part of the fluidizing medium in the trailing end is displaced therefrom upwardly so that the bed just above the air chamber 26 descends downwardly under gravity. Above this moving bed, the fluidizing medium is supplemented, as explained hereunder, from the fluidized bed accompanied by a circulating flow 36. With the repetition of the above, a certain part of the fluidizing medium above the air chamber 26 becomes a mass to form a moving bed 35 that gradually descends and diffuses.

The fluidizing medium moved above the air chambers 25 and 27 is blown upwardly against the inclined walls 29 where it is deflected and whirled towards the center of the incinerator in the upward direction; however, due to the sudden increase of the sectional area of the incinerator, it loses its upwardly moving velocity such as to move onto the top of the descending moving bed 35, gradually descends, and is blown up again for circulation upon reaching the trailing end of the moving bed. A part of the fluidizing medium circulates as circulating flows 36 within the fluidized bed.

When combustibles are charged through the combustible charge opening 34 of the incinerator under the fluidized state as above explained, the combustibles fall on the top of the descending moving bed 35. Since the fluidizing medium near the top behaves in such a manner as to flow in the direction gathering towards the center away from the sides, the combustibles are entrained in the flows and embedded in the top of the descending moving bed 35. Accordingly, light substances such as paper are with certainty entrained within the descending moving bed 35 and are prevented from being merely incinerated on the surface of the conventional fluidized bed without contributing to the heating of the fluidizing medium; they are with certainty incinerated within the descending moving bed 35 and circulating flows 36 to effectively heat the fluidizing medium.

Within the moving bed 35, heat decomposition of the combustibles is effected partially to generate a combustible gas. In such case, since the generated combustible gas is diffused in the horizontal directions as the fluidizing medium descends and diffuses and is burnt within the fluidized bed, the exothermic energy derived from the burning of the gas is made effective to heat the fluidizing medium.

Even if heavy and bulky materials such as bottles and lumps of metal or the like are charged on the surface of the descending moving bed 35, they are not caused to instantaneously fall onto the top of the air chamber 26 but are suspended by the moving bed 35 and are gradually lowered towards the incombustible discharge opening 24 together with the flows of the fluidizing medium.

Therefore, combustibles having a relatively large size are dried, gasified or incinerated within the descending moving bed 35 during the gradual downward travel and they are almost incinerated to become a small size by the time they reach the trailing end of the moving bed so that they do not interfere with the formation of the fluidized bed.

Accordingly, it is not necessary to pre-shred the combustibles with a shredder and it is enough to break the bags encasing the combustibles by means of the combustible feeding device 23. Thus the shredder or the shredding step may be omitted so as to make the facility compact.

The combustibles charged into the descending moving bed 35 rapidly diffuse in the fluidizing medium and, thus, the incinerating efficiency is increased.

The medium size incombustibles fed through the combustible feeding device 23 firstly move downwardly and laterally within the descending moving bed 35 and, during such movement, any combustibles (for example the coating on electric wires) unitarily attached to or incorporated in the incombustibles are incinerated. The incombustibles that reach the trailing end are delivered to the incombustible discharge openings 24 due to the lateral movement of the fluidizing medium and the inclination of the diffusion plate 22 and are discharged through vertical passages 37.

Thence, the incombustibles are delivered by a conveyor 38 to a sieve (not shown) and the fluidizing medium is sorted.

In the circulating type fluidized bed incinerator shown in the foregoing FIGS. 1 and 2, the fluidizing medium is composed of solid grains which usually have a size of 1 mm or so and the incinerator is operated at the fluidizing medium temperature of 600°–800° C., the exhaust gas temperature being 750°–950° C.

The exhaust gas is cooled to approximately 300° C. by a gas cooling chamber or air pre-heater and discharged through a chimney stack after removal of minute particles, or after recovering thermal energy by means of a boiler provided downstream of the exhaust gas discharge opening for the purpose of utilizing the waste thermal energy, or after passing through U-shaped conduits of a water warmer inserted in the free board portion 21 or 41, etc. and recovering more of the thermal energy, or being cooled as the dust is removed.

In cases where the exothermic energy of combustibles is high and the fluidizing medium is heated over a predetermined temperature, for example to more than 800° C., there is a possibility that the fluidizing medium will be sintered such as to make the fluidized bed inoperable if alkaline metal compounds are included in the combustibles. In such cases, it has been the practice to lower the temperature of the fluidizing medium to a predetermined temperature by spraying water onto the medium.

Consideration has therefore been given in such cases to recovering thermal energy held in the fluidizing medium by inserting thermal conducting conduits into the fluidizing medium; however there have been several problems in that, if many thermal conducting conduits are inserted into the fluidized bed, not only is the fluidization obstructed by the incombustibles, and abrasion of conducting conduits by the fluidizing medium, but also a thermal energy recovering operation always has to be in order to protect the thermal conducting conduits even if thermal energy recovery is unnecessary. Therefore, the operation has not been free of these drawbacks.

On the other hand, with respect to the conventional fluidizing bed type boiler, there are two kinds as noted below which can be distinguished from each other by giving consideration to the arrangement of the thermal conducting portion and the incineration of minute unburnt combustibles that are scattered from the fluidized bed.

(1) a fluidized bed boiler of non-recycling type (referred to as a conventional fluidized bed boiler or bubbling type boiler), and (2) a fluidized bed boiler of recycling type.

In the non-recycling type, thermal conducting conduits are arranged within the fluidized bed and the heat transfer is effected under high heat transfer efficiency by virtue of physical contact between the conduits and the burning fuels at the high temperature and the fluidizing medium. In the recycling type, a part of the minute combustibles which are not yet burnt, as well as ash or fluidizing medium (a recycling solid), merges into a flow of combustion gas and is directed to a heat transferring portion provided independently of the combustor where incineration of the unburnt substances is continued, the solid after this heat transfer being returned to the combustor together with a part of the combustion gas. This type of boiler is named due to the type of recycling noted above.

In the fluidized bed type boiler, a variety of fuels having different characteristics may be incinerated according to the particular incineration process but several drawbacks have recently been noticed. In regard to the bubbling type, its loading capacity, the complexity of the fuel feeding system, the requirement for a large quantity of lime for denitration, and the abrasion of thermal conducting conduits, etc. have been recognized as drawbacks inherent thereto. It has been realized that the recycling type is capable of solving these inherent drawbacks. However, further technical developments remain to be achieved with respect to maintaining proper temperatures in the recycling system including a combustor and a cyclone, scaling-up of the apparatus and solving the problem that cold starting requires a long time.

SUMMARY OF INVENTION

The inventors of this application have been investigating the above problems in order to seek appropriate solutions thereto and have found the following matters to be effective. That is, in the circulating fluidized bed type incinerator, an inclined partition wall is provided on the inside of the incinerator wall and above the end portion of the diffusion plate in place of the inclined wall to form a primary incinerating chamber of the fluidized bed and provision for a thermal energy recovery chamber is also made between the back side of the inclined partition wall and the incinerator wall or between two inclined partition walls so that the recovery chamber communicates at the upper and lower portions thereof with the primary incinerating chamber of the fluidized bed, thermal conducting conduits adapted to pass heating medium therethrough being inserted into the thermal energy recovery chamber and a diffuser for the thermal energy recovery chamber being provided at the lower part of the recovery chamber along the back side of the partition wall. The heated fluidizing medium introduced into the thermal energy recovery chamber beyond the upper portion of the inclined partition wall is subjected to the fluidizing gas blown from the diffuser and regulated in an amount of 0–3 Gmf or preferably 0–2 Gmf to form a static bed or a descending moving bed of the fluidizing medium so that the thermal energy of the fluidizing medium is recovered by the heating medium passing through the thermal conducting conduits. The inventors found that, by the arrangement noted above, it is possible to easily control the temperature of the primary incinerating chamber of the fluidized bed in the incinerator above explained while effectively recovering the thermal energy by the thermal conducting conduits in the fluidized zone where the degree of abrasion of the thermal conducting conduits is small.

The inventors have further investigated and developed the circulating fluidized bed type incinerator provided with the thermal energy recovery chamber that accompanies the inclined partition wall and the method for recovering thermal energy and controlling the feeding rate of the fuel and found it possible to form an effective circulating fluidized bed using the fluidizing medium heated in the primary chamber and to introduce a sufficient amount of the heated fluidizing medium required in the thermal energy recovery chamber by arranging the inclination of the inclined partition wall to be 10°–60° or preferably 25°–45° relative to the horizon and the projection length of the inclined partition wall in the horizontal direction on the bottom of the incinerator to be 1/6–½ or preferably ¼–½ of the horizontal length of the bottom of the incinerator. Also the inventors found it possible not only to fully meet the demand from users utilizing the recovered thermal energy but also to limit the degree of temperature variation in the primary chamber within a small range by controlling the amount of thermal energy recovered from the thermal energy recovery chamber by regulation of the thermal calories of the heating medium passed through the thermal conducting conduits, for example by regulating the flow rate, pressure and temperature of the vapor or the temperature, etc. of the hot water, etc. at the same time of regulating the amount of air blown from the diffuser for controlling the descending rate of the fluidizing medium in the thermal energy recovery chamber in response to variations in the demands from the users, for example those regarding the vapor pressure and temperature and the regulation of the amount of fuel supplied, such being determined in response to the demands from the users or based upon the temperature in the primary chamber.

That is, the present invention is directed to (1) An internal recycling type fluidized bed boiler characterized in that it comprises:

a primary fluidized bed incinerating chamber constructed by:

an air diffusion plate provided at the bottom of an incinerator and adapted to inject fluidizing air upwardly under a mass flow that is at least greater at one side than that at the other side; and an inclined partition wall provided above the portion of said diffusion plate where the mass flow is greater so as to interfere with the upward flow of the fluidizing air and thereby to deflect the air towards the portion above said other side of the diffusion plate where the mass flow is smaller;

a thermal energy recovery chamber formed between said inclined partition wall and a side wall of the incinerator or between the two inclined partition walls;

a heat exchanging surface means provided within said thermal energy recovery chamber for the passage of a heat sink fluid therethrough; and an air diffuser provided at the lower portion of said thermal energy recovery chamber and the back side of said inclined partition wall;

said thermal energy recovery chamber being communicated at the upper and lower portions thereof with said primary fluidized bed incinerating chamber, said inclined partition wall being inclined by 10°–60° relative to the horizon and the projection length thereof in the horizontal direction being 1/6–½ of the horizontal length of the incinerator bottom, a moving bed being formed above the portion of said diffusion plate where the injected mass flow is smaller so that the fluidizing medium descends and diffuses within the moving bed, and a circulating fluidized bed being formed above the portion of the diffusion plate where the mass flow of the fluidizing air is greater so that the fluidizing medium is actively fluidized and circulated towards a position above said moving bed and a part of the fluidizing medium is introduced into said thermal energy recovery chamber beyond the upper portion of said inclined partition wall, the formation of said moving bed and said circulating fluidized bed being effected by regulation of the amount of air injected upwardly from said diffusion plate and the regulation of the fluidizing air injected from said diffuser in said thermal energy recovery chamber causing the fluidizing medium within said recovery chamber to descend in the state of a moving bed for recycling: and (2) A method of controlling an internal recycling type fluidized bed boiler constructed by comprising:

a primary fluidized bed incinerating chamber constructed by:

an air diffusion plate provided at the bottom of an incinerator and adapted to inject fluidizing air upwardly under a mass flow that is at least greater at one side than that at the other side; and an inclined partition wall provided above the portion of said diffusion plate where the mass flow is greater so as to interfere with the upward flow of the fluidizing air and thereby to deflect the air towards the portion above said other side of the diffusion plate where the mass flow is smaller;

a thermal energy recovery chamber formed between said inclined partition wall and a side wall of the incinerator or between the back sides of two inclined partition walls;

a heat exchanging surface means provided within said thermal energy recovery chamber for the passage of a heat sink fluid therethrough; and an air diffuser provided at the lower portion of said thermal energy recovery chamber and the back side of said inclined partition wall;

said thermal energy recovery chamber being communicated at the upper and lower portions thereof with said primary fluidized bed incinerating chamber.

said method being characterized in that the amount of air injected from said diffusion plate is regulated so that a moving bed is formed above the portion of said diffusion plate where the injected mass flow is smaller with the fluidizing medium descending and diffusing within the moving bed, and a circulating fluidized bed is formed above the portion of the diffusion plate where the mass flow of the fluidizing air is greater with the fluidizing medium being actively fluidized and circulated towards a position above said moving bed and a part of the fluidizing medium being introduced into said thermal energy recovery chamber beyond the upper portion of said inclined partition wall, the fluidizing air being injected from the diffuser in said recovery chamber so as to cause the fluidizing medium within said recovery chamber to descend and recycle in the state of a moving bed, the amount of thermal energy recovered by said thermal energy recovery chamber being controlled by the regulation of the amount of gas injected from the diffuser in said recovery chamber based on demands from the user side utilizing the generated vapor and hot water, and the amount of fuel supplied to the primary fluidized bed incinerating chamber being controlled based on the temperature of said primary fluidized bed incinerating chamber.

BRIEF EXPLANATION OF DRAWINGS

FIG. 5 is a graph showing the relationship between the amount of air for fluidization (Gmf) at the portion below the inclined partition wall in the primary fluidized bed incinerating chamber and the amount of the fluidizing medium recycled;

FIG. 6 is a graph indicating the relationship between the amount of diffusing air (Gmf) in the thermal energy recovery chamber and the descending rate of the downward moving bed in the thermal energy recovery chamber;

DETAILED DESCRIPTION OF THE INVENTION

Hereinafter, the present invention will be explained in detail referring to the accompanying drawings.

Figure 3:
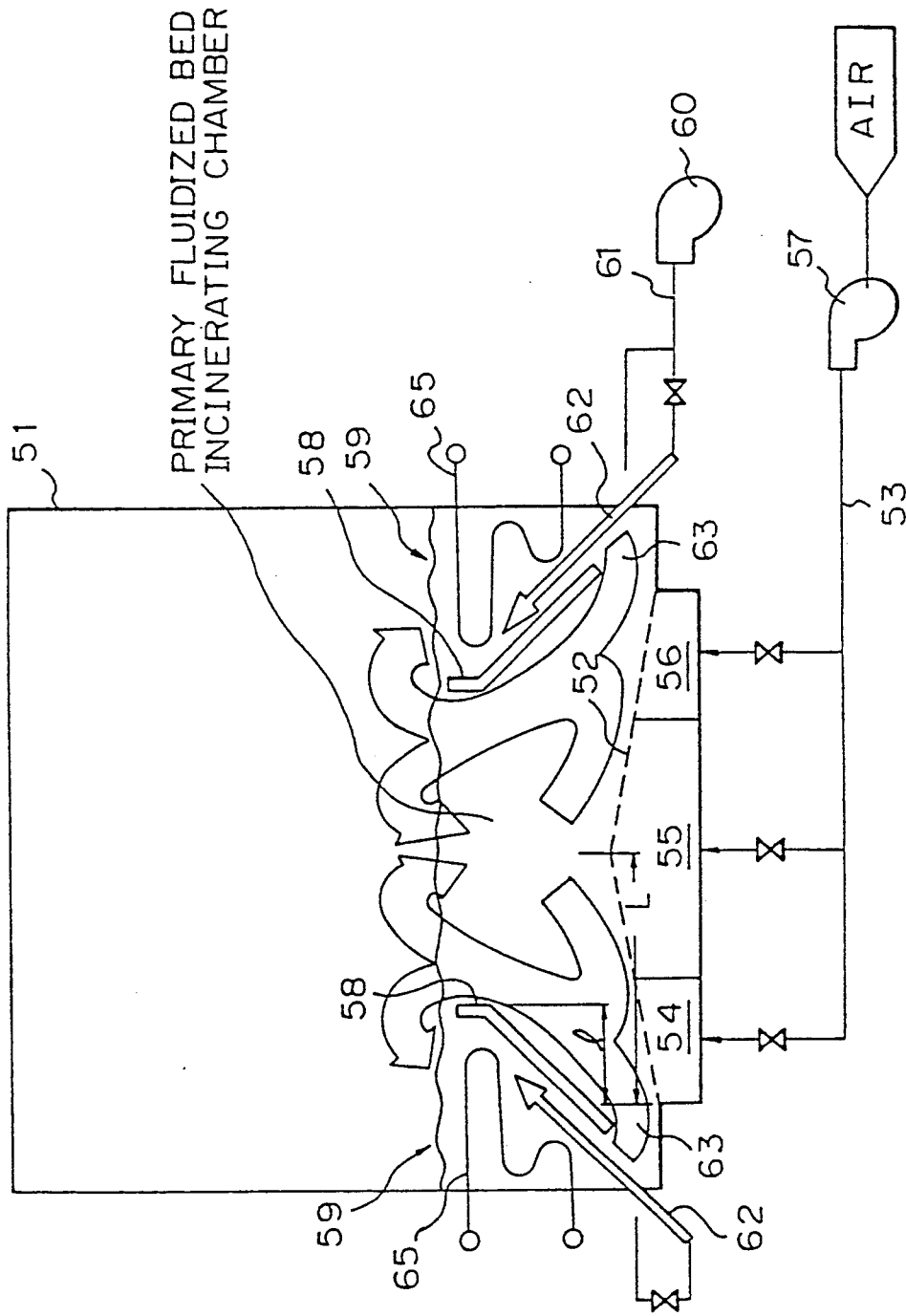
FIG. 3 is a schematic illustration explaining the principle of the present invention.

In FIG. 3, a diffusion plate 52 is provided at the bottom of an incinerator 51 for introducing fluidizing air fed by a blower 57 through a fluidizing air feeding conduit 53, the diffusion plate 52 being configured in the shape of a hill (chevron shape) approximately symmetrical about the center line of the incinerator so that the opposite end portions are lower than the center portion thereof. The fluidizing air fed from the blower 57 is arranged to be injected upwardly from the air diffusion plate 52 through air chambers 54, 55 and 56 and the mass flow of the fluidizing air injected from the opposite end air chambers 54 and 56 is arranged to be sufficient to form the fluidized bed of the fluidizing medium within the incinerator 51, while the mass flow of the fluidizing air injected from the center air chamber 55 is selected to be smaller than that from the former as explained before in connection with the examples of prior art.

Inclined partition walls 58 are provided above the opposite end air chambers 54 and 56 as deflecting wall means designed to interfere with the upwardly directed passage of fluidizing air and to deflect the air towards the center of the incinerator, the circulating flows in the directions of the arrows shown being generated due to the presence of the inclined partition walls 58 and the difference in the mass flow of the injected fluidizing air. On the other hand, thermal energy recovery chambers 59 are formed between the back side surfaces of the inclined partition walls 58 and side walls of the incinerator so that a part of the fluidizing medium may be introduced during the operation into the thermal energy recovery chambers 59 beyond the upper ends of the inclined partition walls 58.

In the present invention, the inclined portion of each inclined partition wall 58 is arranged to incline by 10°-60°, or preferably 25°-45°, relative to the horizontal and the projection length l thereof in the horizontal direction relative to the incinerator bottom is arranged to be 1/6-½, or preferably ¼-½, of the horizontal length L of the incinerator bottom.

Figure 17:
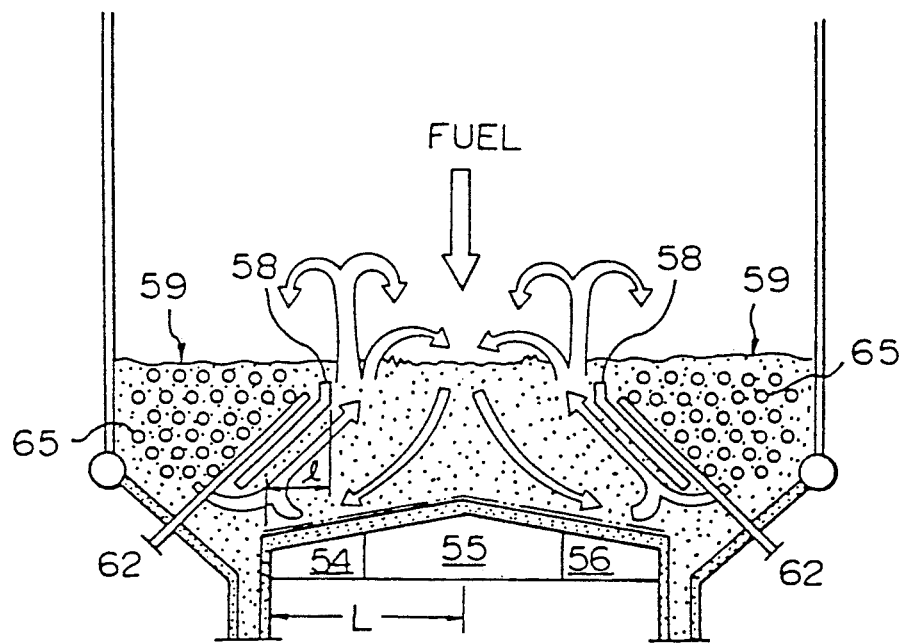
FIGS. 17-19 illustrate fluidizing patterns in a primary fluidized bed incinerating chamber with the relationship between the horizontal length L of the incinerator bottom and the projection length l of the inclined partition wall in the horizontal direction.

The angle of the inclination relative to the horizontal and the projection length in the horizontal direction of the inclined partition wall are both factors which influence the fluidizing state of the fluidizing medium in the primary fluidized bed incinerating chamber and the amount of grains introduced into the thermal energy recovery chambers. Incidentally, the meaning of "L" and "l" and the flowing modes of the fluidizing medium are shown in FIG. 17.

If the angle of inclination of the inclined portion is either smaller than 10° or greater than 60° relative to the horizontal, a satisfactory circulating flow is not produced and the condition under which the fuel is incinerated deteriorates. This angle is preferably in the range between 25° and 45° and it is particularly preferable if it is set at approximately 35°.

Figure 18:
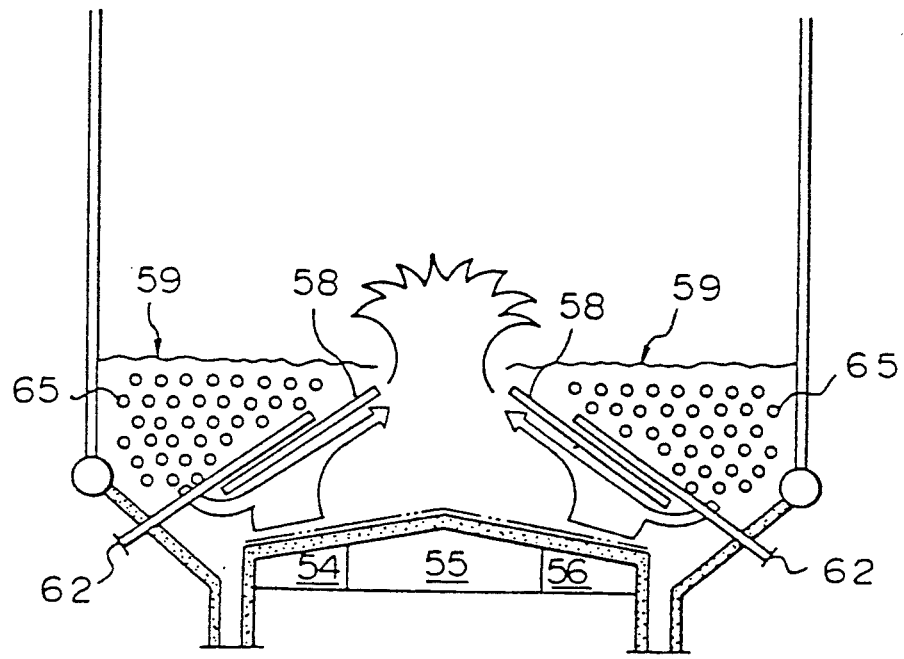

In the case where the projection length l of the inclined partition wall in the horizontal direction relative to the incinerator bottom is greater than ½ of the incinerator bottom length L as shown in FIG. 18, the amount of fluidizing medium deflected from the inclined partition walls and caused to fall on the center of the incinerator becomes smaller thereby adversely affecting the formation of the moving bed at the incinerator center as well as the descending and diffusing mode of the fuel charged into the incinerator center.

Figure 19:
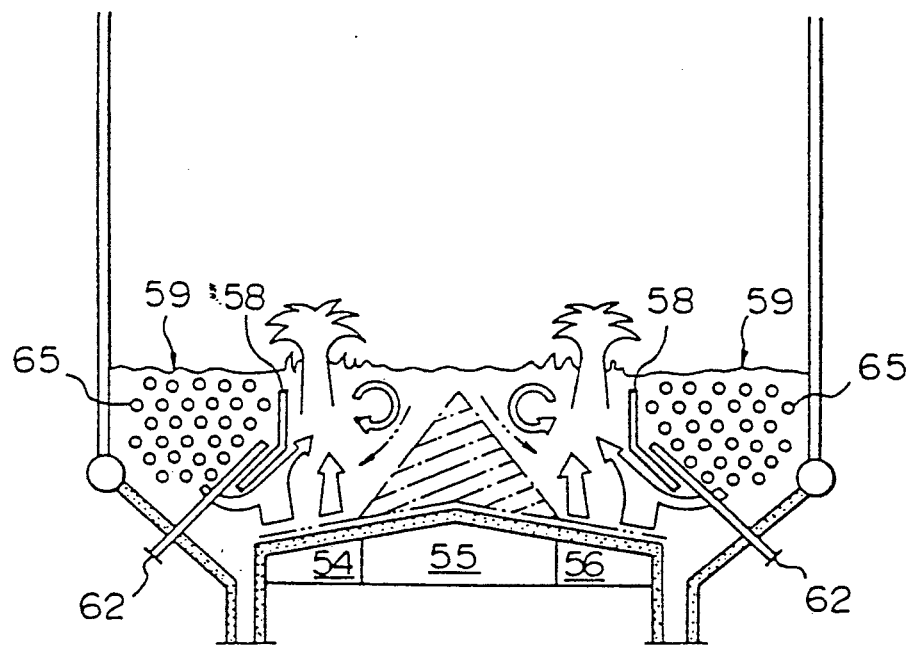

On the other hand, in a case such as that shown in FIG. 19 where the projection length l of the inclined partition wall relative to the incinerator bottom is smaller than 1/6 of the incinerator bottom length L, the formation of the circulating flow in the primary fluidized bed incinerating chamber and particularly the forming mode of the moving bed at the incinerator center is caused to deteriorate whereby the fuel entraining and diffusing effect is also affected adversely and the deflected flow of fluidizing medium into the recovery chamber becomes insufficient.

At the lower portion of the thermal energy recovery chamber 59 and the back side of the inclined partition wall 58, a diffuser 62 for the thermal energy recovery chamber is provided for introducing gas such as air from a blower 60 through a feeding conduit 61. At the portion in the thermal energy recovery chamber 59 adjacent to the place where the diffuser 62 is disposed, an opening port 63 is provided and the fluidizing medium introduced into the thermal energy recovery chamber 59 is caused to continuously or intermittently descend with a moving bed being formed, depending on the operating mode, and recycled into the incinerating portion through the opening port 63.

Figure 4:
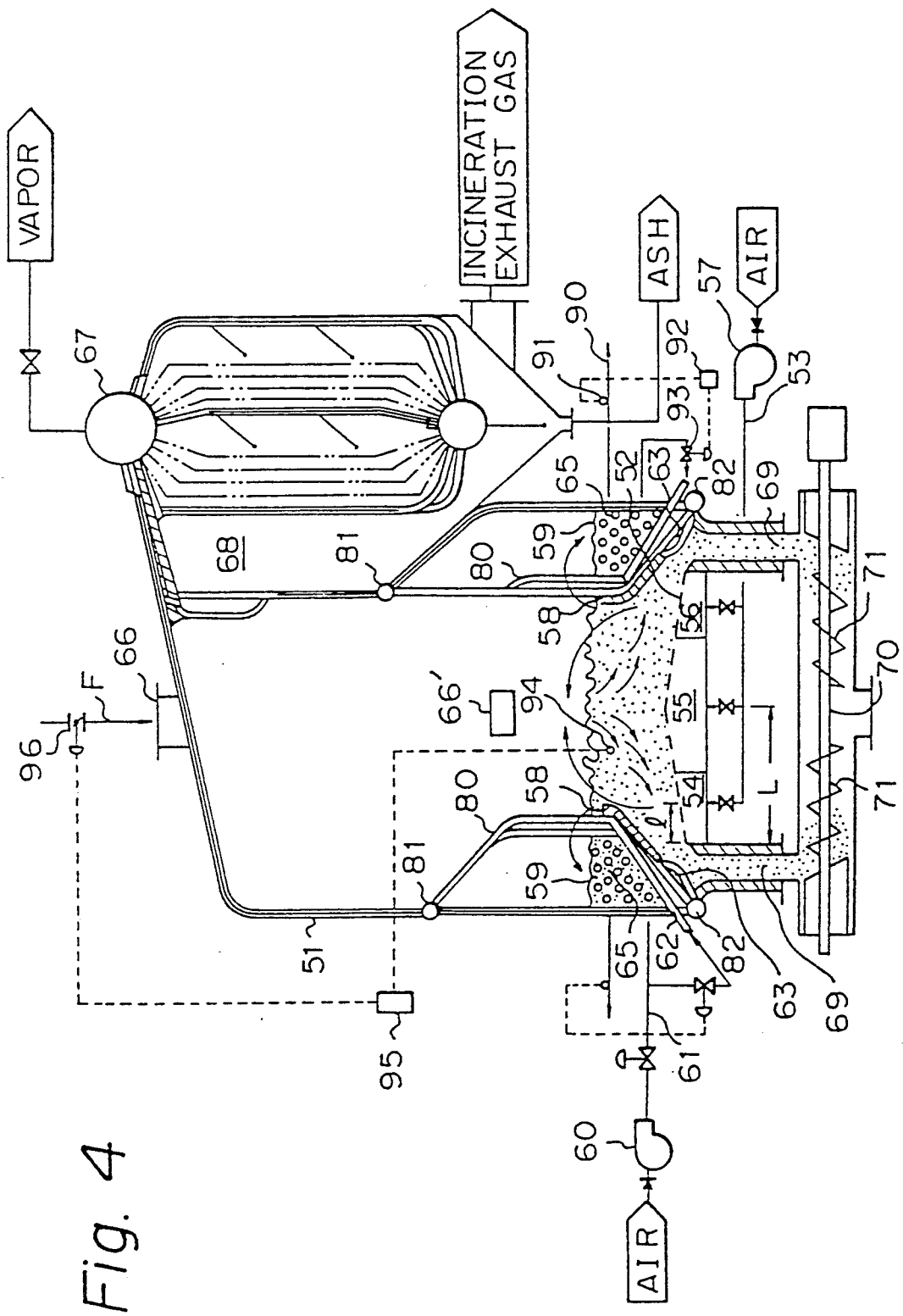
FIG. 4 is a sectional view of an internal recycling type fluidized bed boiler explaining in outline the construction according to the present invention.

FIG. 4 shows an embodiment based on the principle of FIG. 3.

The descending amount of the fluidizing medium in the thermal energy recovery chamber for recycling is regulated by the amount of diffusing air for the thermal energy recovery chamber and the amount of fluidizing air for the incinerating portion. That is the amount of fluidizing medium ($G_1$) introduced into the thermal energy recovery chamber is increased as shown in FIG. 5 if the amount of fluidizing air injected from the diffusion plate 52, particularly that from the end air chambers 54 and 56 which is intended to cause fluidization at the incinerating portion, is increased. Further, as shown in FIG. 6, the amount of fluidizing medium descending in the thermal energy recovery chamber is changed approximately proportional to the change in the amount of diffusing air blown into the thermal energy recovery chamber when the change is in the range 0–1 Gmf and it becomes approximately constant if the amount of diffusing air for the thermal energy recovery chamber is increased beyond 1 Gmf. This constant amount of fluidizing medium is almost equivalent to the amount of fluidizing medium ($G_1$) introduced into the thermal energy recovery chamber and thus the amount of fluidizing medium descending in the thermal energy recovery chamber becomes equivalent to a value corresponding to $G_1$. By controlling the air amount both for the incinerating portion and the recovery chamber, the descending amount of fluidizing medium in the thermal energy recovery chamber 59 may be regulated.

The descent of the fluidizing medium in the static bed when in the range of 0–1 Gmf is due to the difference in weight of the fluidizing medium (the difference in height of the fluidized beds) as between the thermal energy recovery chamber and the primary fluidized bed incinerating chamber and, in the case where the mass flow is over 1 Gmf, the height of the moving bed portion becomes slightly higher or approximately equal to the other. The recycling of the fluidizing medium is assisted by a deflecting flow with a sufficient amount of fluidizing medium brought about by the inclined partition wall.

Now, the relationship between the height of the fluidized bed and the recycling amount of the fluidizing medium (the deflecting flow) will be explained in detail.

In the case where the surface of the fluidized bed is lower than the upper end of the inclined partition wall, the air flow moving upwardly along the inclined partition wall is given its direction by that wall and injected along the inclined partition wall from the fluidized bed, the fluidizing medium being accompanied therewith. The injected air flow is put in a state different from that in the fluidized bed and freed from the fluidizing medium with which the fluidized bed is filled, and the sectional area of the air flowing passage is suddenly enlarged whereby the injected air flow is diffused and its speed is reduced to a few meters per second, becoming a gentle flow, and is exhausted upwardly. Therefore, the fluidizing medium that accompanies the injected air flow loses its kinematic energy to fall due to gravity and the friction with the exhaust gas as the grain size of the fluidizing medium is too large (approximately 1 mm) to be carried with the air flow.

In the case where the surface of the fluidized bed is higher than the upper end of the inclined partition wall, a part of the fluidizing medium gathered by the partition walls is injected along the deflecting partition wall with the direction imparted in a manner similar to that in the circulating type fluidized bed incinerator, while the other part, due to a sudden boiling phenomenon derived from the explosion of bubbles, is boiled upwardly like fire works just above the upper end of the inclined partition wall and falls all around the periphery. Accordingly, a part of the fluidizing medium is introduced in a large amount towards the back side of the partition wall, i.e. the thermal energy recovery chamber.

That is, the moving direction of the injected fluidizing medium becomes closer to upright as the surface becomes higher above the upper end of the inclined partition wall. Therefore, the amount of fluidizing medium introduced into the thermal energy recovery chamber becomes large in the case where the surface is slightly above the upper end of the inclined partition wall.

In FIG. 5 is shown the relationship between the amount of fluidizing air in the portion below the inclined partition wall in the primary fluidized bed incinerating chamber and the amount of fluidizing medium recycled through the thermal energy recovery chamber.

For example, during the operation under the state $L_1$, if the height of the fluidized bed is lowered due to the scattering of the abraded fluidizing medium, the recycling amount of the fluidizing medium is suddenly reduced to, for example, below 1/10 of that of the former and thermal energy recovery cannot be performed. Thus, what is important is the amount of the fluidizing air and, if it is arranged to be more than 4 Gmf and preferably more than 6 Gmf, the value of $G_1/G_0$ is maintained over 1 and the required and sufficient amount of the recycling fluidizing medium may be obtained even if the height of the fluidized bed is changed.

Further, by arranging the mass flow of the air injected from the diffuser in the bottom of the thermal energy recovery chamber to be 0–3 Gmf, or preferably 0–2 Gmf, and the mass flow of the fluidizing air injected from the diffusion plate disposed below the inclined partition wall to be 4–20 Gmf or preferably 6–12 Gmf, that is by always keeping the mass flow to be larger at the incinerating chamber side than at the thermal energy recovery chamber side, the amount of fluidizing medium fed back to the primary fluidized bed incinerating chamber from the thermal energy recovery chamber may be regulated.

As to the moving bed in the thermal energy recovery chamber, it is referred to in the academic sense as a static bed in the case where the mass flow is 0–1 Gmf and a fluidized bed in the case where the mass flow is over 1 Gmf and it is commonly known that a minimum mass flow of 2 Gmf is required for generating a stable fluidized bed. On the other hand, in the case of the moving bed according to the present invention which is always descending and moving, the descending moving bed is satisfactorily formed until the mass flow is increased to the order of about 1.5–2 Gmf without causing the destruction of the moving bed by the bubbling phenomenon. It is assumed that the grains of the fluidizing medium gradually descend and move under a vibrating mode whereby the fluidizing air is converted into small air bubbles uniformly flowing upward towards the upper portion of the moving bed.

Figure 8:
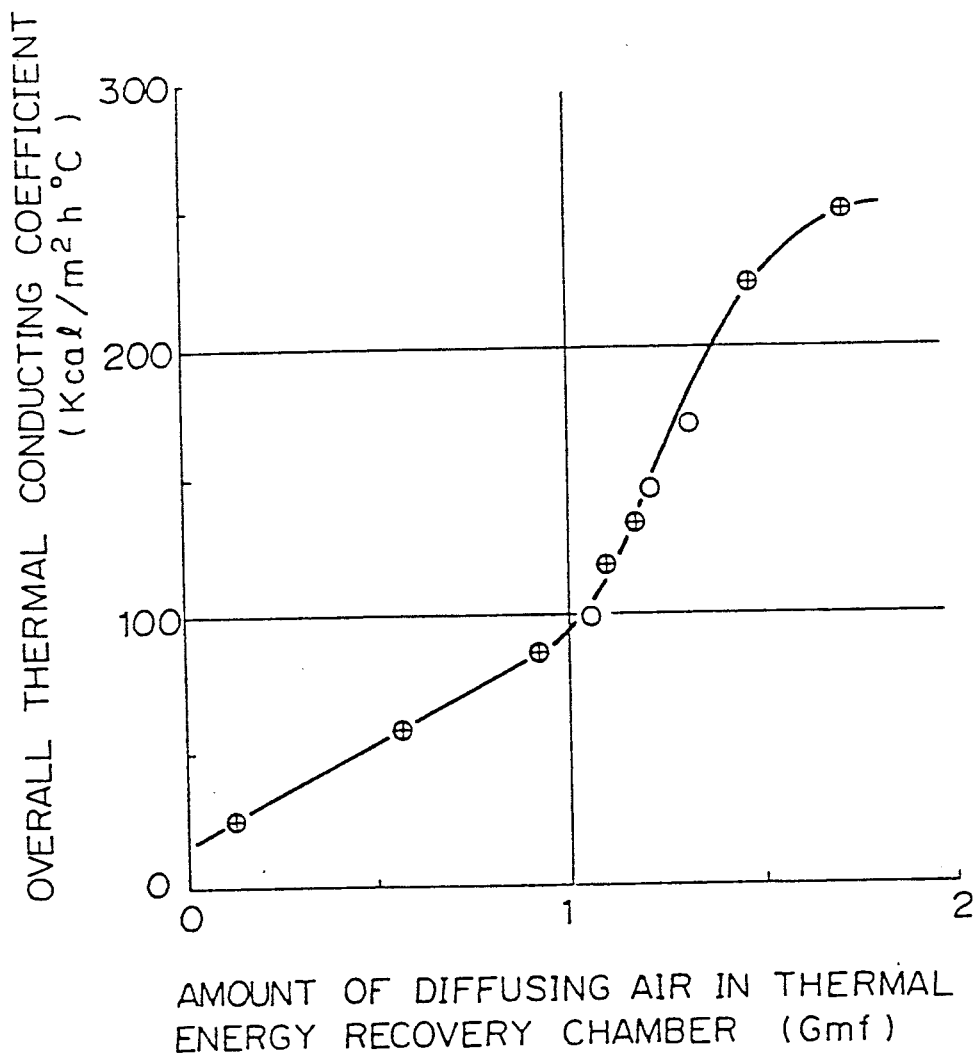
FIG. 8 is a graph indicating the relationship between the diffusion mass flow (Gmf) in the thermal energy recovery chamber and the overall thermal conducting coefficient in the internal recycling type fluidized bed boiler according to the present invention.

Inside the thermal energy recovery chamber 59, thermal conducting conduits 65, through which a heat sink fluid such as vapor or water, etc. is passed, are arranged so that the thermal energy is recovered from the fluidizing medium by effecting a heat transfer with the fluidizing medium downwardly moving in the thermal energy recovery chamber. The thermal conducting coefficient in the thermal energy recovering portion is greatly varied as shown in FIG. 8 in a case where the amount of the diffusing air in the thermal energy recovery chamber is changed in the range of 0–2 Gmf.

Now the characteristics such as the load response characteristics brought about by the formation of the moving bed in the thermal energy recovery chamber will be explained.

Figure 7:
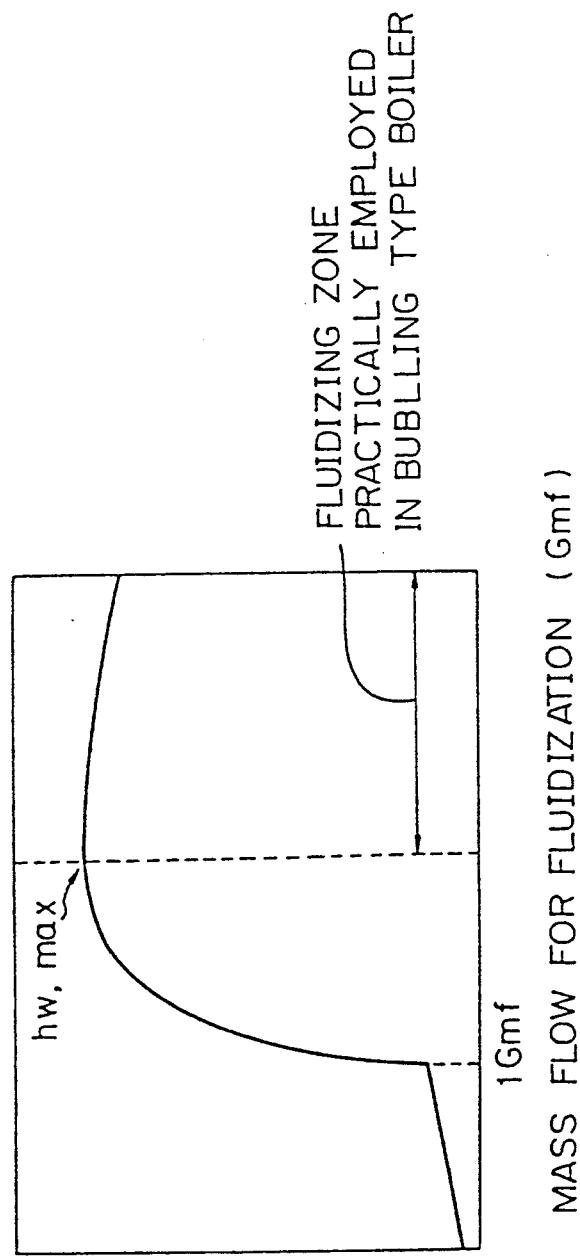
FIG. 7 is a graph indicating the relationship between the mass flow for fluidization (Gmf) and the overall thermal conducting coefficient in the conventional bubbling type boiler.

The general relationship between the overall thermal conducting coefficient and the mass flow for fluidization is shown in FIG. 7. Between the values of the mass flow in the range of 0–1 Gmf, the increase in the thermal conducting coefficient is small and it suddenly increases when the mass flow becomes over 1 Gmf. As a method for turning down the fluidized bed boiler utilizing the above phenomenon, the "Wing Panel Type" was introduced in DOE Report, 6021 (2), 655–633 (1985) and the thermal conducting coefficient in response to the variation of the fluidizing mass flow is stated to be insensitive (static bed) or too sensitive (fluidized bed).

Incidentally, upon reviewing certain foreign patent specifications, several cases are found which seem to be similar to the present technology in the point that the incinerating chamber and the thermal energy recovery chamber are separated; however, all the partitions disclosed therein are constructed with a vertical orientation and the fluidizing medium in the thermal energy recovery chamber is in the mode for being changed to the static bed and to the fluidizing bed, it being the static bed when the thermal energy recovery is small in amount and the fluidizing bed in which the medium is blown upwardly from the lower portion when the thermal energy recovery is large in amount. This is because it is difficult to produce a deflected flow with a vertically oriented partition as compared to the case where the partition is inclined. It is therefore inevitable in the case of the vertically oriented partition that the fluidizing medium is arranged in both the incinerating chamber and the thermal energy recovery chamber to be in a fluidized state (similar to water) so that the fluidizing medium is caused to flow between the two chambers.

The relationship between the overall thermal conducting coefficient and the mass flow for fluidization is shown in FIG. 8. As shown in FIG. 8, it changes almost linearly and, thus, the amount of thermal energy recovered and the temperature of the primary fluidized bed incinerating chamber may be controlled optionally. Further, such control may be easily effected simply by regulation of the amount of diffusing air in the thermal energy recovery chamber.

Figure 9:
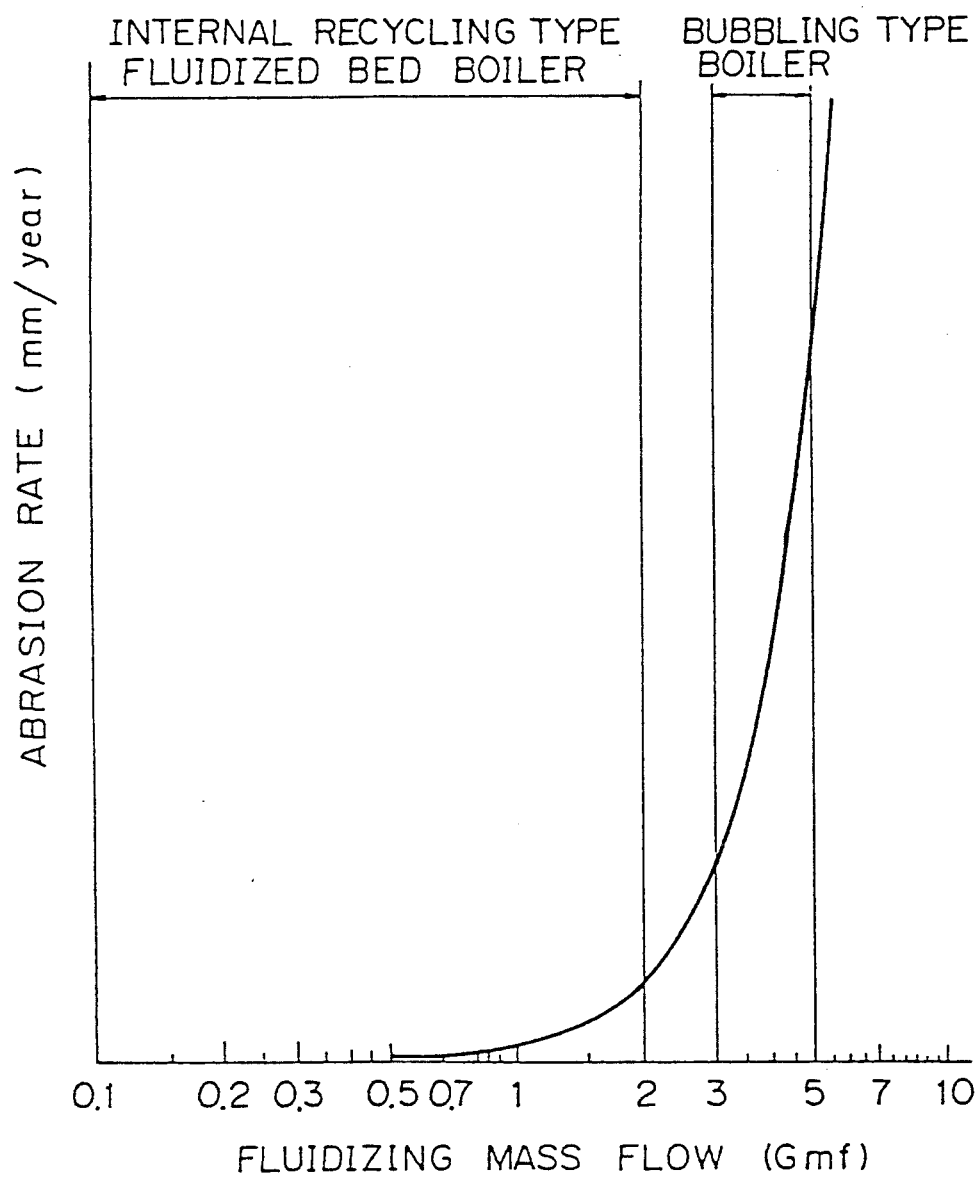
FIG. 9 is a graph showing the relationship between the mass flow for fluidization and the abrasion rate of the thermal conducting conduit.

Also it is said that the abrasion rate of the thermal conducting conduits in the fluidized bed is proportionate to the cube power of the mass flow for fluidization and such relationship is shown in FIG. 9. Accordingly, the problem of abrasion regarding the thermal conducting conduits may be solved by arranging the amount of diffusing air blown into the moving bed in the thermal energy recovery chamber to be 0–3 Gmf or preferably 0–2 Gmf.

In order to regulate the amount of thermal energy recovered, regulation of the amount of recycling fluidizing medium is effected, as explained before, while effecting simultaneous regulation of the thermal conducting coefficient. That is, if the amount of fluidizing gas in the air chambers 54 and 56 for the primary fluidized bed incinerating chamber is made constant and the amount of diffusing air in the thermal energy recovery chamber is increased, the amount of recycling fluidizing medium is increased and the thermal conducting coefficient is simultaneously increased to greatly increase the amount of thermal energy recovered as the effect of a combination of the two factors. From the viewpoint of the temperature of the fluidizing medium in the fluidized bed, the above corresponds to the effect of preventing the temperature of the fluidizing medium from being raised above the predetermined temperature.

As a means for introducing the diffusing gas into the thermal energy recovery chamber 59, several means may be considered but it is generally disposed such as to be inclined along the back side of the inclined partition wall (the side facing the thermal energy recovery chamber) so as to effectively utilize the thermal energy recovery chamber.

Also, in the diffuser, the open ports for injecting the diffusing air are made smaller as their location becomes closer to the tip end of the diffuser (as the height of the bed becomes smaller) so that the diffusing air is prevented from being injected in large amounts at the tip end portion.

The respective sizes of the open ports are preferably determined so that an approximately uniform diffusing amount is injected over the full length of the diffuser 62 with the diffusing air amount being 2 Gmf. That is, when the above is met, it is possible to obtain the maximum amount of thermal energy recovered by all the thermal conducting surfaces in the thermal energy recovery chamber and the abrasion rate of the thermal conducting surfaces may be kept small over all the surfaces.

In FIG. 4, numeral 66 is a combustible charge inlet provided at the upper portion of the incinerator 51 and 67 is a steam drum for forming a circulating passage (not shown) with the thermal conducting conduits 65 in the thermal energy recovery chambers 59. Numeral 69 represents incombustible discharge outlets coupled to the opposite end sides of the air diffusion plate 52 in the bottom of the incinerator 51 and 70 is a screw conveyor provided with screws 71 each having a helex opposite to the other.

Incidentally, the location of the combustible charge inlet is not limited to the upper portion of the boiler and it may be disposed at the side of the boiler as a spreader 66' for charging coal, etc. therethrough.

The combustibles F charged through the combustible charge inlet 66 or 66' are circulated and incinerated in the fluidizing medium which is circulating under the influence of the circulating flow caused by the fluidizing air. At this time, the fluidizing medium at the upper center above the air chamber 55 is not accompanied by a violent up-and-down motion thereof and forms a descending moving bed which is in a weak fluidizing state. The width of this moving bed is narrow at the upper portion thereof and the trailing ends thereof are extended in the opposite directions to reach the portions above the air chambers 54 and 56 at the opposite side ends, thus being subjected to the fluidizing air injected at a greater mass flow from both air chambers and blown upwardly. Accordingly, a portion of each trailing end is displaced and, thus, the bed just above the air chamber 55 descends under gravity. Above this bed, the fluidizing medium piles up having been supplemented from the fluidizing bed, as explained later, and the fluidizing medium above the air chamber 55 forms a gradually and continuously descending moving bed with the repetition of the above modes.

The fluidizing medium moved above the air chambers 54 and 56 is blown upwardly and deflected and whirled by the inclined partition walls 58 towards the center of the incinerator 51 and falls on the top of the central moving bed and is circulated again as explained before, a part of the fluidizing medium being introduced into the thermal energy recovery chambers 59 beyond the upper portions of the inclined partition walls. In the case where the descending rate of the fluidizing medium in the thermal energy recovery chamber 59 is slow, the angle of repose for the fluidizing medium is formed at the upper portion of the thermal energy recovery chamber and the excess fluidizing medium falls from the upper portion of the inclined partition wall to the primary fluidized bed incinerating chamber.

The fluidizing medium introduced into the thermal energy recovery chamber 59 forms a gradually descending moving bed due to the gas injected from the diffuser 62 and it is returned to the primary fluidized bed incinerating chamber from the opening portion 63 after the thermal transfer is effected with the thermal conducting conduits.

The mass flow of the diffusing air introduced from the diffuser 62 in the thermal energy recovery chamber 59 is selected from values in the range of 0-3 Gmf or preferably 0-2 Gmf.

The reason for the above is that, as shown in FIG. 8, the thermal conducting coefficient varies from the minimum to the maximum below the value of 2 Gmf and the abrasion rate can be controlled, as shown in FIG. 9, within a small range.

Further, the thermal energy recovery chamber is out of the strong corrosive zone of the primary fluidized bed incinerating chamber under the reducing atmospheres and, thus, the thermal conducting conduits 65 are subjected to less corrosion as compared to the conventional ones and the degree of abrasion of the thermal conducting conduits 65 is made quite small because the fluidizing rate in this portion is, as explained before, low. As to the speed of air flow in the fluidizing air mass flow range 0-2 Gmf, it is quite low, for example such as 0-0.4 m/sec. (superficial velocity), at 800° C. while it practically depends on the temperature and grain size of the fluidizing medium.

In a case where the combustibles are mixed with incombustibles having a size greater than the grain size of the fluidizing medium, the incineration residue is discharged together with a part of the fluidizing medium by the screw conveyor 70 disposed at the bottom of the incinerator.

Regarding the thermal conduction in the thermal energy recovery chamber 59, in addition to the thermal conduction that takes place due to the direct contact between the fluidizing medium and the thermal conducting conduits 65, there is another form of thermal conduction that utilizes the rising gas moving upwardly as the conducting media, the gas moving up with irregular vibration as the fluidizing medium moves. In the latter case, there is substantially no boundary layer between the solid articles prohibiting the thermal conduction, in contrast to the ordinary contact thermal conduction between gas and solid articles, and the fluidizing medium is well agitated so that the thermal conduction within the grains of the fluidizing medium may be neglegible, which fact may not be disregared in a case where the medium is stationary; thus, quite substantial thermal conducting characteristics may be obtained. Accordingly, in the thermal energy recovery chamber according to the present invention, it is possible to obtain a large thermal conducting coefficient almost equal to ten times that obtained in the conventional incinerating gas boiler.

As explained above, the thermal conducting phenomenon that occurs between the fluidizing medium and the thermal conducting surfaces largely depends on the strength or weakness of the fluidization and the amount of recycling fluidizing medium can be controlled by regulating the amount of gas introduced from the diffuser 62. Also, by arranging the thermal energy recovery chamber 59 with its moving bed to be independent from the primary incinerating chamber within the incinerator, it is possible to construct a compact thermal energy recovery apparatus in which the turning down ratio is large and the fluidized bed may be easily controlled.

In a boiler using combustibles having a low incinerating rate such as coal or petro cokes as fuels therefor, it is impossible in most cases to rapidly vary the vaporizing amount except for varying the vaporizing amount only in correspondence with the incinerating rate. In a bubbling type boiler, the situation becomes still inferior compared to that in the former boiler because the thermal energy recovery is effected based on the temperature of the fluidized bed.

However, in the present invention the thermal conducting amount is instantaneously varied in the range between several times and several fractions by changing the amount of diffusing air in the thermal energy recovery chamber. Therefore, the variation in the thermal energy input into the fluidized bed based on the variation in the feeding amount of the combustibles depends on the incineration rate and causes a time lag; however, the amount of thermal energy recovery taking place in the thermal energy recovery chamber according to the present invention can be rapidly varied by varying the amount of diffusing air in the thermal energy recovery chamber and the response difference between the thermal input and the thermal recovery can be absorbed as a temporary change in the temperature of the fluidizing medium due to the heat sensibility sinking capacity of the fluidizing medium forming the fluidized bed. Accordingly, the thermal energy can be utilized without waste thereof and the regulation of the vaporizing amount having good response characteristic, which cannot be achieved with a conventional boiler such as one incinerating coal, can be obtained.

Incidentally, the locations of the incombustibles discharge openings 69 are, as shown for example in the drawing, perferably determined at positions near the opening ports 63 and the opposite side ends of the air diffusion plate in the incinerator 51; however, the location is not limited to that explained above.

In FIG. 4, the air diffusion plate 52 is illustrated as having the shape of a hill; however, if the amount of the fluidizing air injected from the air chambers 54 and 56 is arranged to be more than 4 Gmf, the circulating flow is formed in the primary fluidized bed incinerating chamber due to the effect of the inclined partition walls and, therefore, the air diffusion plate 52 may be made a horizontal one in the case where combustibles such as coal containing a few incombustibles are incinerated. Also, the incombustible discharge opening may be omitted.

As explained above, the capability of the fluidized bed boiler according to the present invention to recover thermal energy is quite superior. Now, the method of controlling the boiler according to the present invention will be explained below.

In the present invention, the amount of thermal energy recovered from the thermal energy recovery chamber is controlled, in response to the demands of the user utilizing the recovered thermal energy, by regulating the amount of gas injected from the diffuser into the thermal energy recovery chamber. Also, the regulation of the temperature in the primary fluidized bed incinerating chamber is effected by controlling the fuel charging amount based on said temperature in the primary fluidized bed incinerating chamber or the vapor pressure and, in the boiler according to the present invention, the thermal conducting coefficient can be optionally adjusted and the variation of the amount of thermal energy recovered in the present invention is absorbed as variation in the sensible heat of the fluidizing medium whereby the boiler can be controlled instantaneously to meet the demands of the user and can be operated under stable conditions.

The explanation is made in relation to FIG. 4. For example, in a case where the temperature of the vapor withdrawn from the thermal conducting conduits 65 is insufficient, a diffusing air regulating valve 93 is regulated in its opening direction by a regulator 92 for the valve 93 based on the temperature sensed by a thermo-sensor 91 on a vapor withdrawing conduit 90 so as to increase the amount of diffusing air injected so that the amount of thermal energy recovered is increased and the vapor temperature is raised to that demanded by the user.

The temperature of the primary fluidized bed incinerating chamber is controlled within a certain range by regulating the amount of fuel fed to the primary fluidized bed incinerating chamber and/or by regulating the amount of air fed to the air chambers 54, 55 and 56 based on the fluidized bed temperature sensed by a thermo-sensor 94.

There is another method wherein the amount of fuel fed to the primary fluidizing bed incinerating chamber is controlled by a pressure signal, for example in the case where the amount of vapor demanded is varied due to a load variation on the user's side, since vapor pressure is the factor which most rapidly changes in response to a change in the demand.

Figure 10:
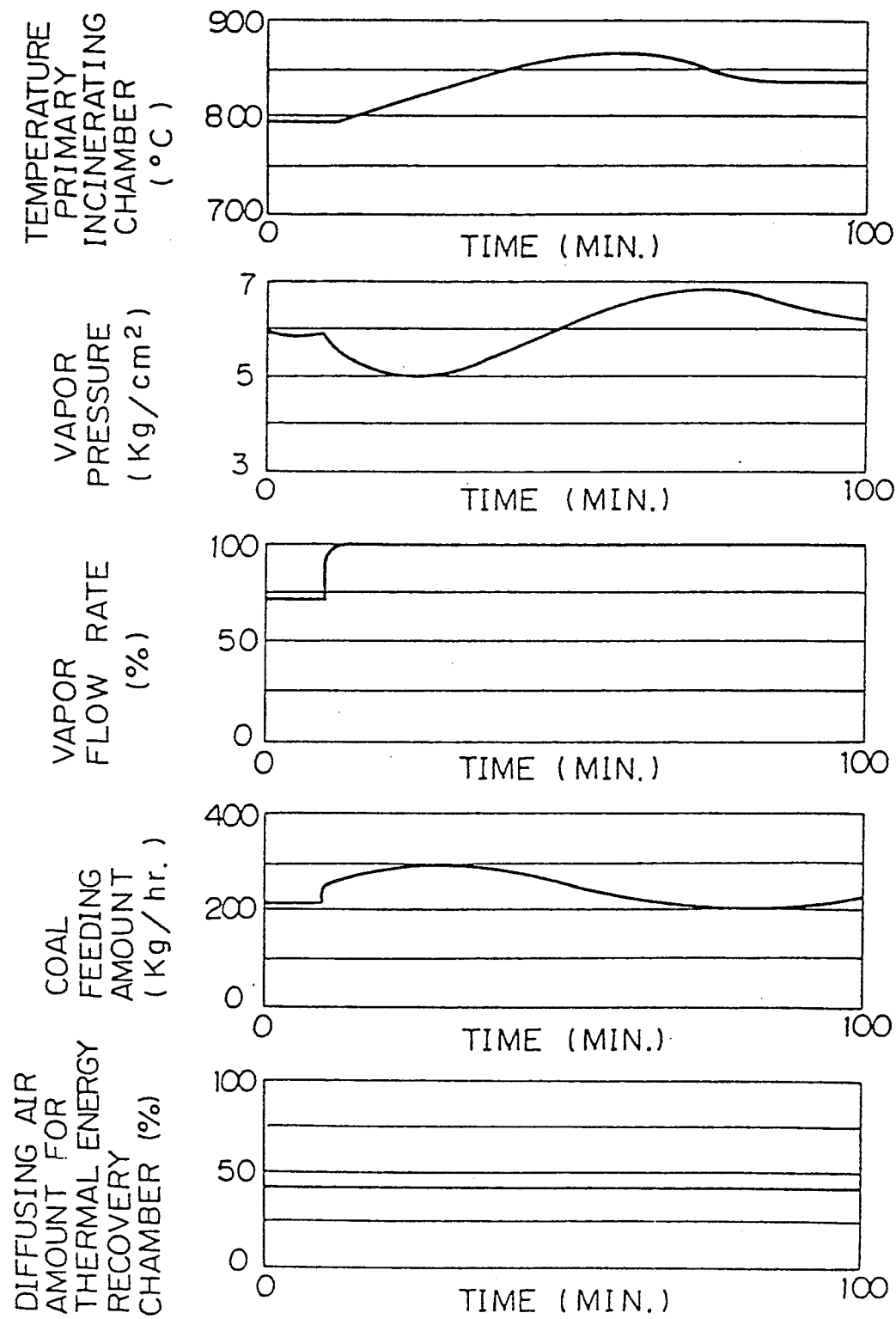
FIGS. 10 and 11 show variations in the fuel feeding amount, vapor pressure and the fluidized bed temperature relative to the lapse of time without and with regulation of the fluidizing mass flow for the thermal energy recovery chamber in response to stepwise change of the vapor flow rate.
Figure 11:
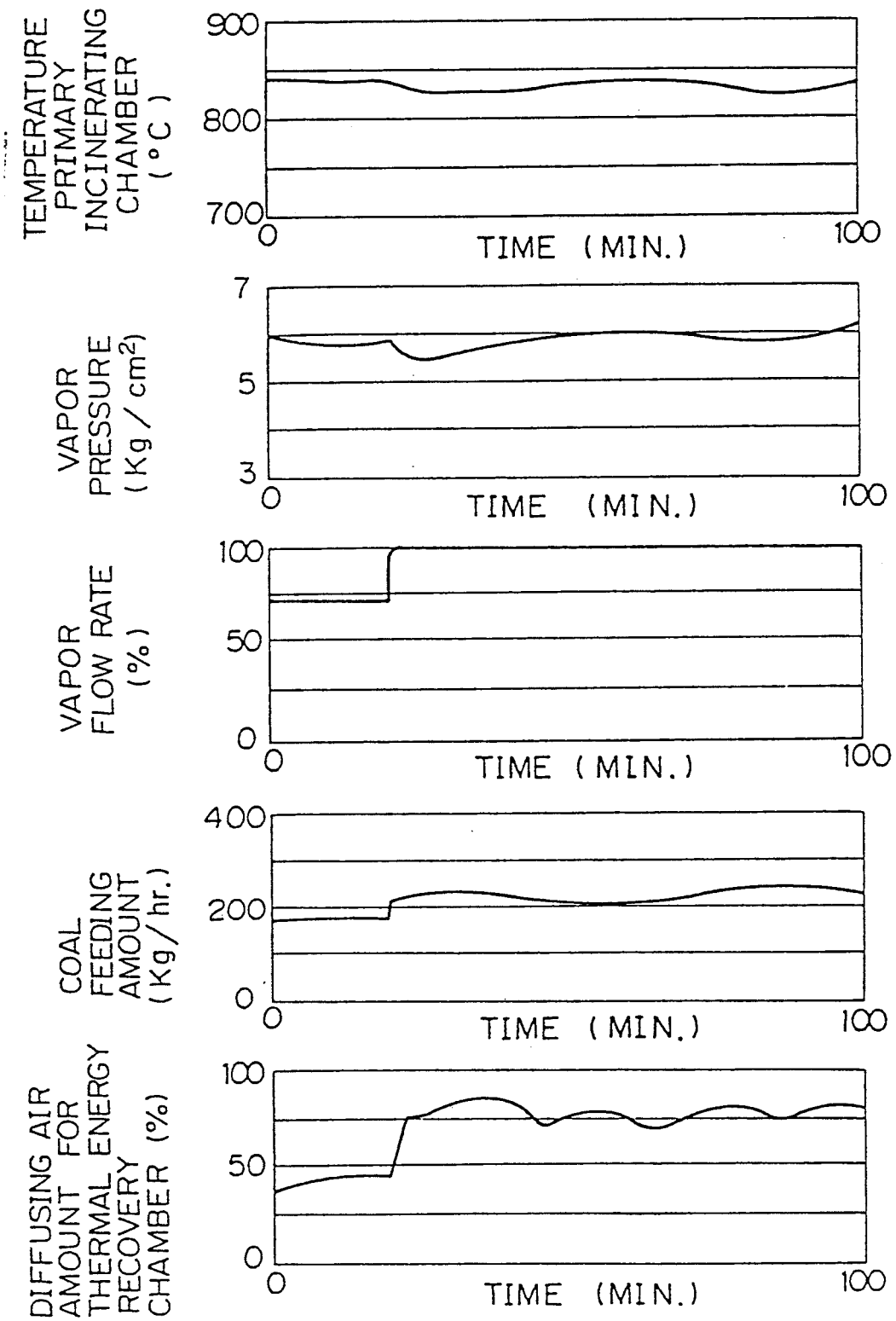

The response characteristics are shown in FIGS. 10 and 11 wherein the vapor flow rate is changed by +30% stepwise from 70% to 100%.

FIG. 10 shows test results obtained when the amount of air from the diffuser in the thermal energy recovery chamber was maintained constant while the vapor flow rate was varied by +30% stepwisely, and FIG. 11 shows test results obtained in a case where the amount of diffusing air was regulated in response to the +30% stepwise variation in the vapor flow rate. Upon comparing the two, it is found that the fluidized bed temperature and the vapor flow rate are constrained to predetermined values within a short time and the variation range is also made small in the case (FIG. 11) where the amount of diffusing air is regulated according to the present invention in response to the variation in the vapor flow rate, as compared with the results for the conventional method shown in FIG. 10.

Incidentally, the variation range of the fluidized bed temperature was approximately ±12° C. and that of the vapor pressure was approximately below ±0.3 kg/cm² (0.029 MPa) in the case where the regulation was effected according to the present invention as shown in FIG. 11.

Figure 12:
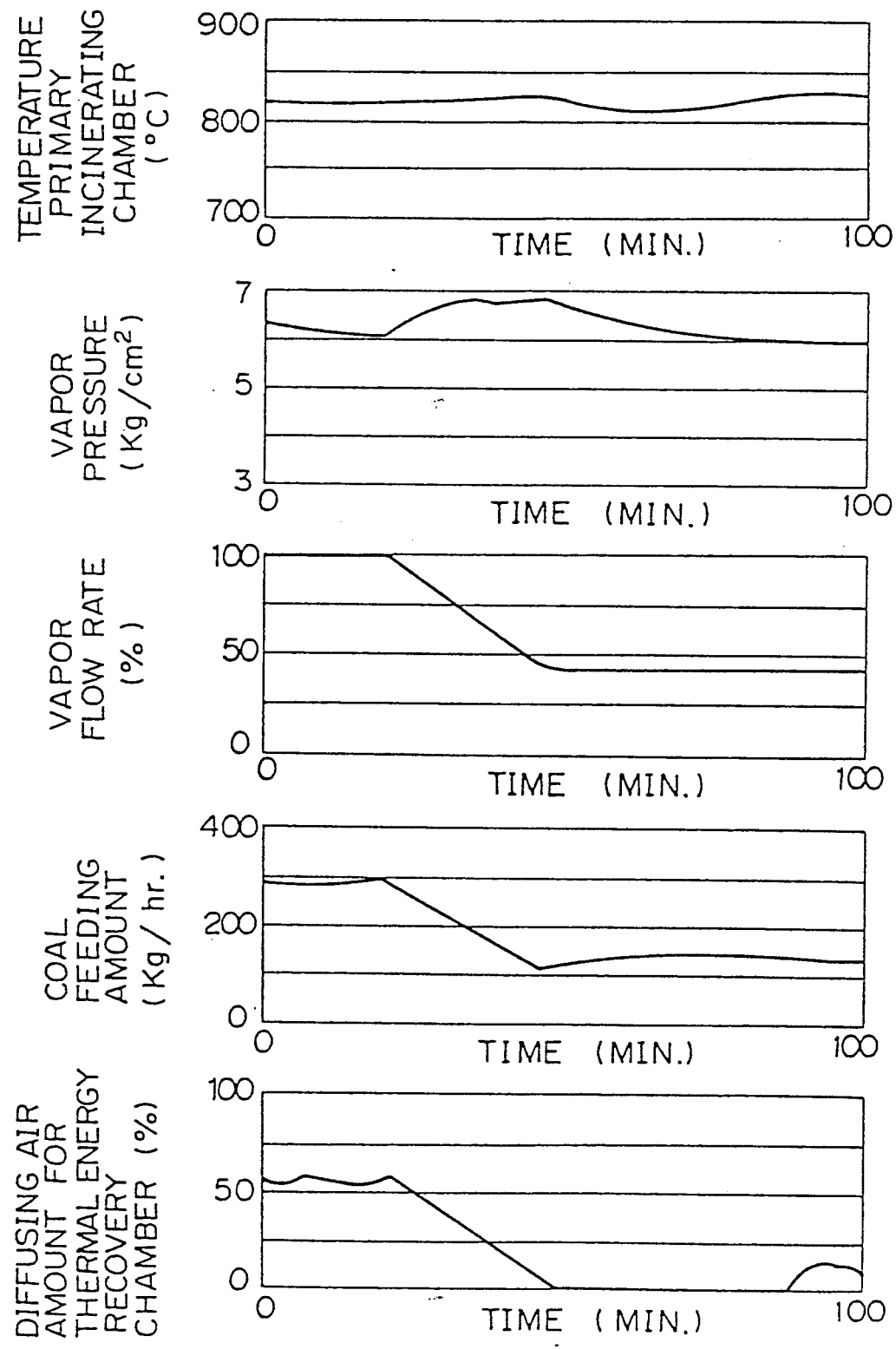
FIG. 12 shows similar variations relative to the lapse of time in response to lumpwise change of the vapor flow rate.

The responding characteristics are also shown in FIG. 12 when the vapor flow rate is varied lumpwisely by −60% wherein the amount of diffusing air in the thermal energy recovery chamber is regulated in response to the above variation in accordance with the present invention. In this case also, it is found that the fluidized bed temperature is almost constant and the variation range of the vapor pressure is small.

Figure 1:
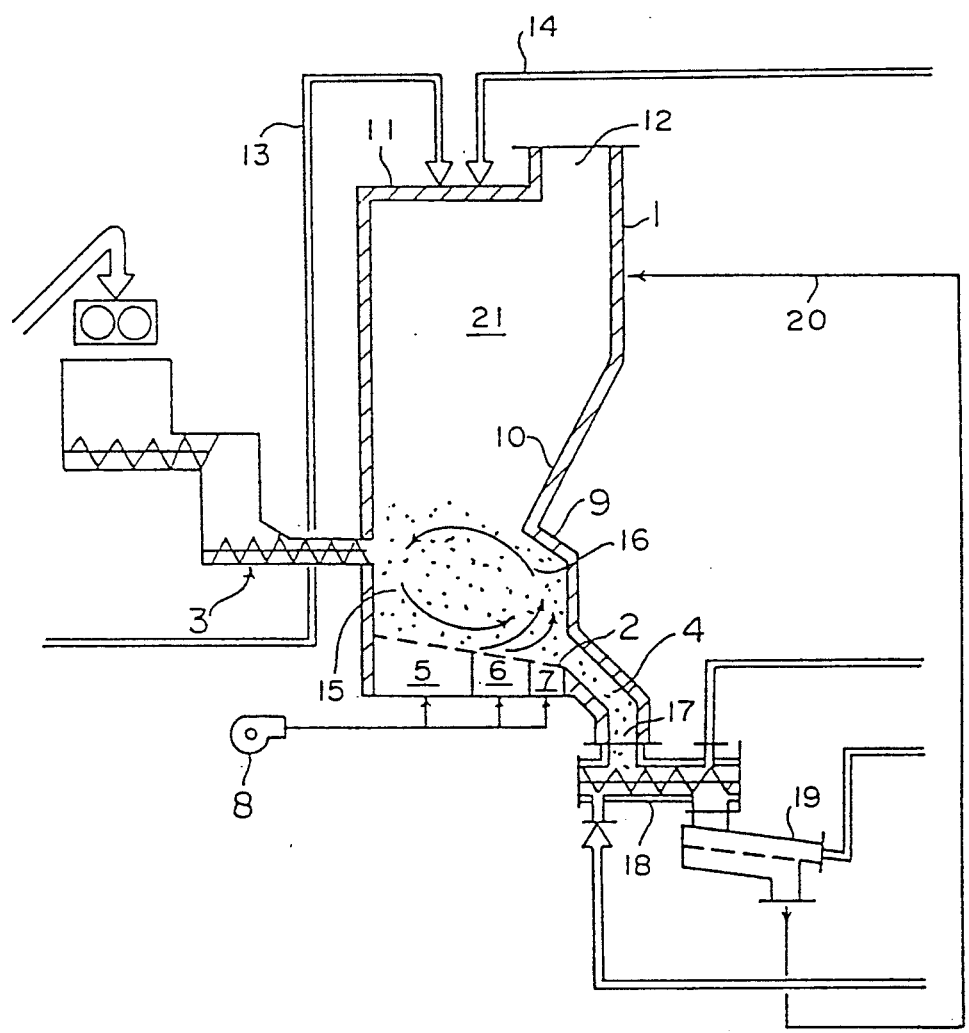
FIGS. 1 and 2 are sectional views explaining the conventional circulating type fluidized bed incinerator.
Figure 2:
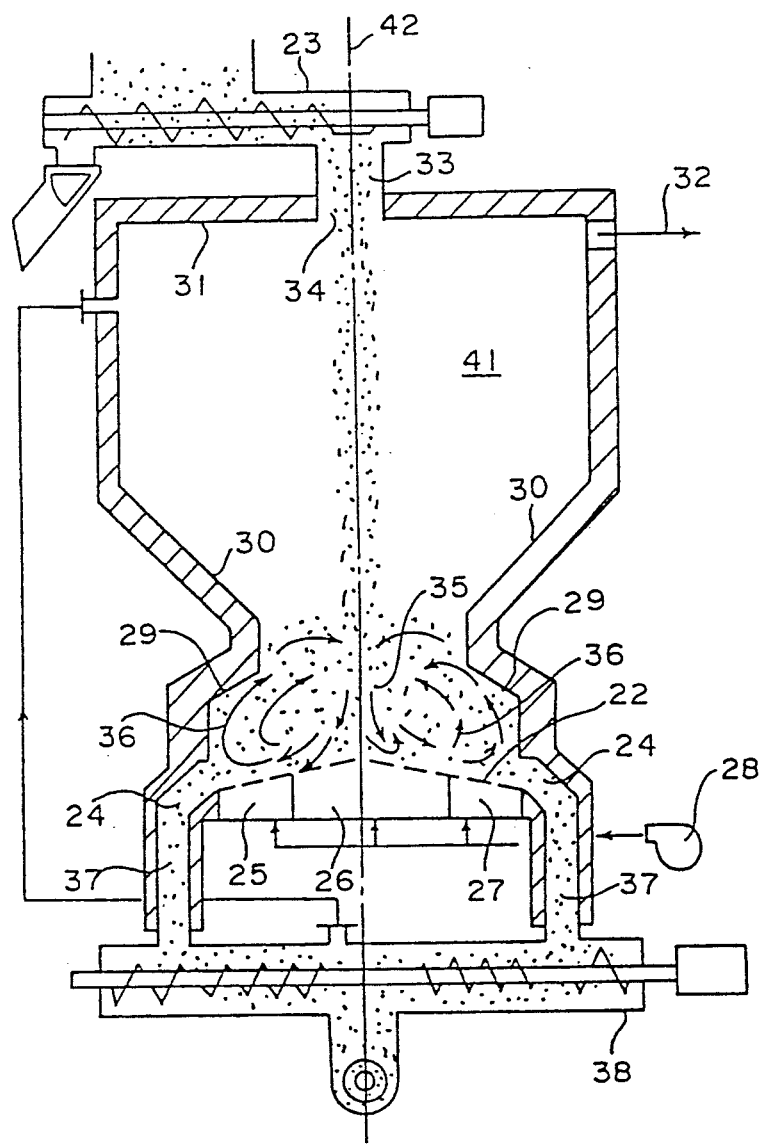

Next, another embodiment according to the present invention will be explained referring to FIG. 13. The embodiment shown in FIG. 13 corresponds to the case wherein the present invention is applied to the incinerator shown in FIG. 1 in which a single circulating fluidized bed is present, the reference numerals being the same as those used in FIG. 3 with respect to the meaning and function thereof.

Figure 14:
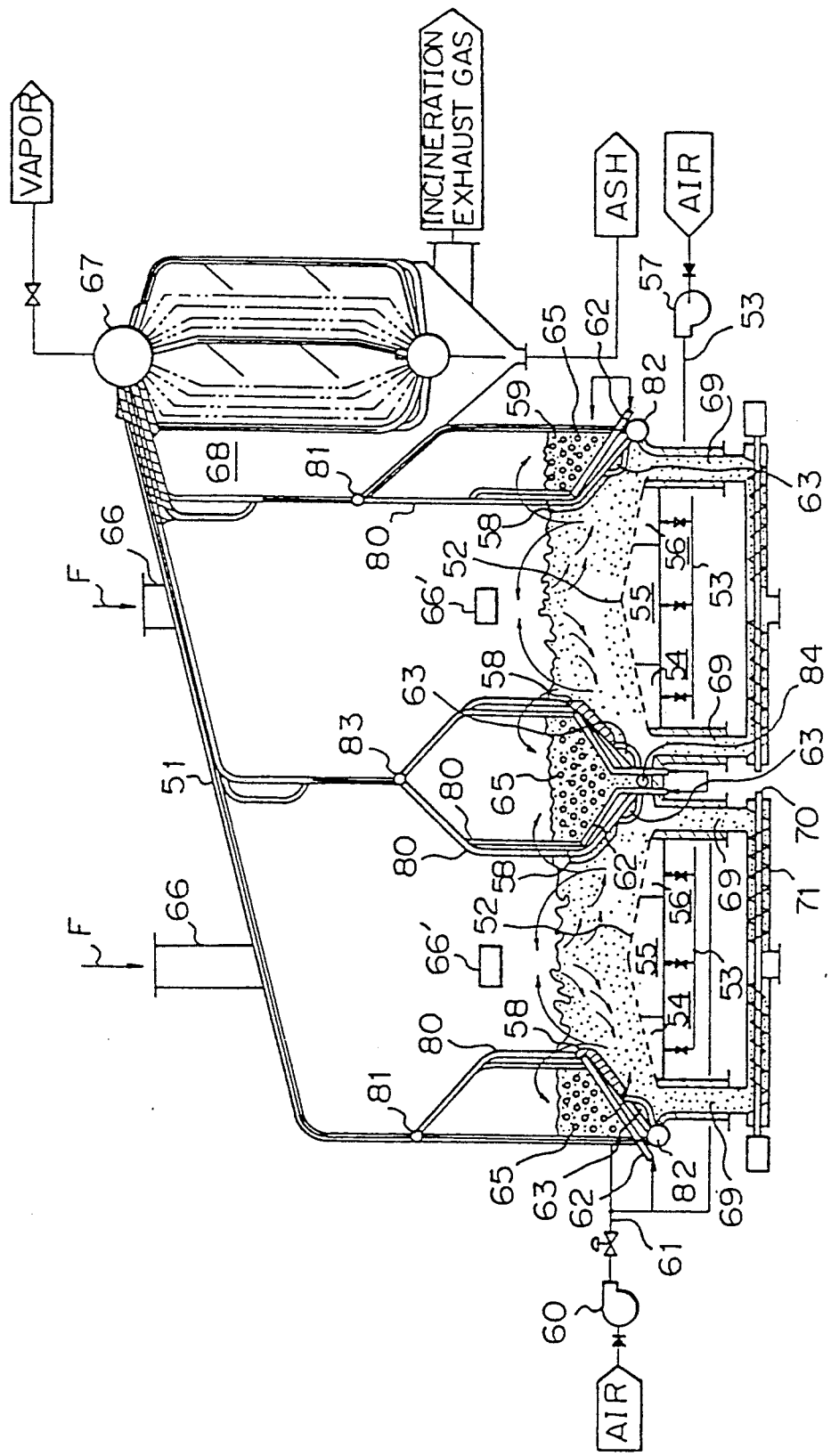

FIG. 14 shows an embodiment to be used when a large size boiler is required. The embodiment shown in FIG. 14 is constructed by combining the two internal recycling type fluidized bed boilers shown in FIG. 4.

As shown in FIGS. 4 and 14, the operation is effected without difficulty by charging fuels from the charge inlet provided in the ceiling. In the case where solid fuels such as coal having a grain size below several centimeters are incinerated, it is preferable to charge the fuel into the incinerating portion from a relatively low position instead of from the ceiling and yet still higher than the surface of the fluidized bed by using a suitable type of equipment such as a spreader adapted to scatter the fuel by means of a rotary blade.

Accordingly, in a case where the apparatus is used solely for incinerating solid fuels such as coal, it is possible to merely provide a spreader of the above type without providing an inlet at the ceiling. Also it is possible to charge combustibles containing large size objects from the ceiling and to charge solid fuels from the spreader just explained so as to incinerate them both mixed together.

Figure 15:
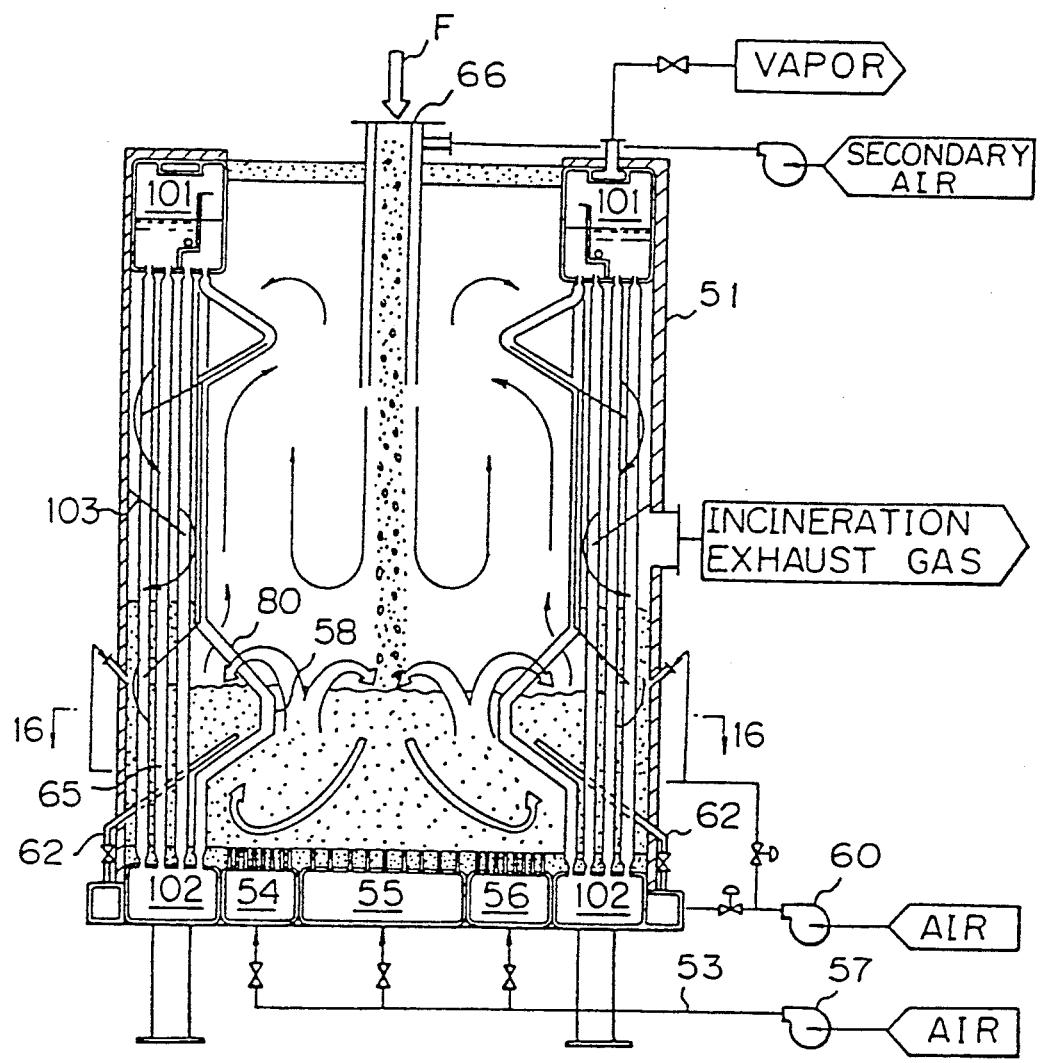
FIG. 15 is a sectional side view of an internal recycling type fluidized bed boiler explaining still another embodiment of the present invention which is particularly adapted for use as a small boiler.

The internal recycling type fluidized bed boilers herein above explained are the sort that are preferably applied to boilers that are medium or large in size. As for small package boilers, it is desirable for them to be made more compact and, thus, an embodiment designed to such end is illustrated in FIG. 15. In the embodiment shown in FIG. 15, the thermal conducting conduits 65 shown within the bed in FIG. 4 are oriented in an almost vertical direction and are extended to an exhaust gas heat conducting portion provided above the thermal energy recovery chamber so that this group of thermal conducting conduits is arranged to also serve as means for unitarily coupling a top water chamber 101 and a bottom water chamber 102.

By arranging the approximately vertical evaporating conduits in a plural number in a free board at the upper portion of the primary fluidized bed incinerating chamber and around the thermal energy recovery chamber, it is possible to utilize them as members for reinforcing the boiler body as well as to eliminate the need for auxiliary devices such as a forcible circulating pump and associated conduits, etc. because the fluid in the thermal conducting conduits including that in the conduits within the bed is automatically circulated.

Further, a fluidized bed boiler and an exhaust gas boiler can be combined as a unitarily structure so that an internal recycling type fluidized bed boiler can be made economically available in a small size.

The construction and function of the present invention are further described hereinbelow in detail. The exhaust gas generated after the incineration in the primary fluidized bed incinerating chamber is passed upwardly through the free board at the portion above the incinerating chamber and thence introduced into the group of thermal conducting conduits formed around the periphery from the upper portion of the group. It is then moved downwardly in a flow moving in a direction that is nearly normal relative to the thermal conducting conduits while effecting heat transfer. At this occasion, a part of the unburnt ash collected by means of baffle plates 103 due to inertiagravity is caused to fall towards the moving bed in the thermal energy recovery chamber so that the unburnt ash is then completely incinerated due to its long dwelling time in that moving bed, thereby improving the incinerating efficiency.

The above situation is particularly effective when coal is used, the unburnt carbon of which needs a long time to be incinerated. However, in other cases where a fuel other than coal is employed and the unburnt ash thereof may not scatter widely, means for recycling the unburnt ash may not be needed.

As to the fuel charge inlet, if it is arranged, for example as a type allowing charging from the top as illustrated, it is preferable to blow the secondary incinerating air towards the primary fluidized bed incinerating chamber. By the arrangement above, an air curtain effect brought about the secondary air is expected to prevent fine fuel particles such as minute powdered coal from being scattered together with the incineration exhaust gas as well as to perform an effective agitation and mixing operation in the free board portion so that it may also contribute to effect sufficient contact between oxygen in the secondary air and the unburnt ash in the exhaust gas, thereby improving the incinerating efficiency and lowering the density of $NO_x$ and $CO$, etc.

Figure 16:
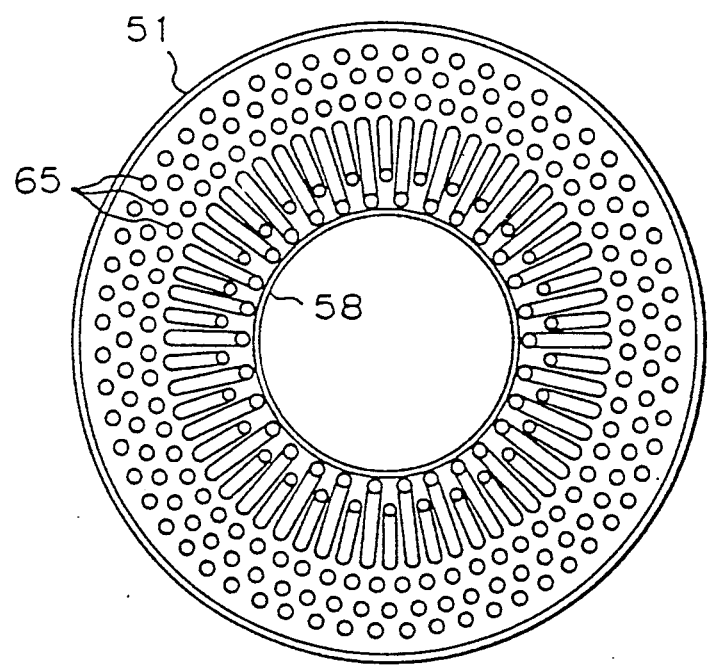
FIG. 16 is a section taken in a plan view on a line shown by the arrows 16—16 in the drawing of the embodiment shown in FIG. 15 which particularly illustrates the section in plan view of an internal recycling type fluidized bed boiler adapted for use in a circularly packaged boiler.

FIG. 16 is a planar sectional view taken along the line shown by the arrow 16—16 in FIG. 15 and it particularly illustrates an example of a circular type boiler. In a case where it is a small size package boiler, it is not particularly necessary to make it a circular type as shown in FIG. 16, but manufacturing the arrangement of the thermal conducting conduits is made easy if it is made circular.

Figure 13:
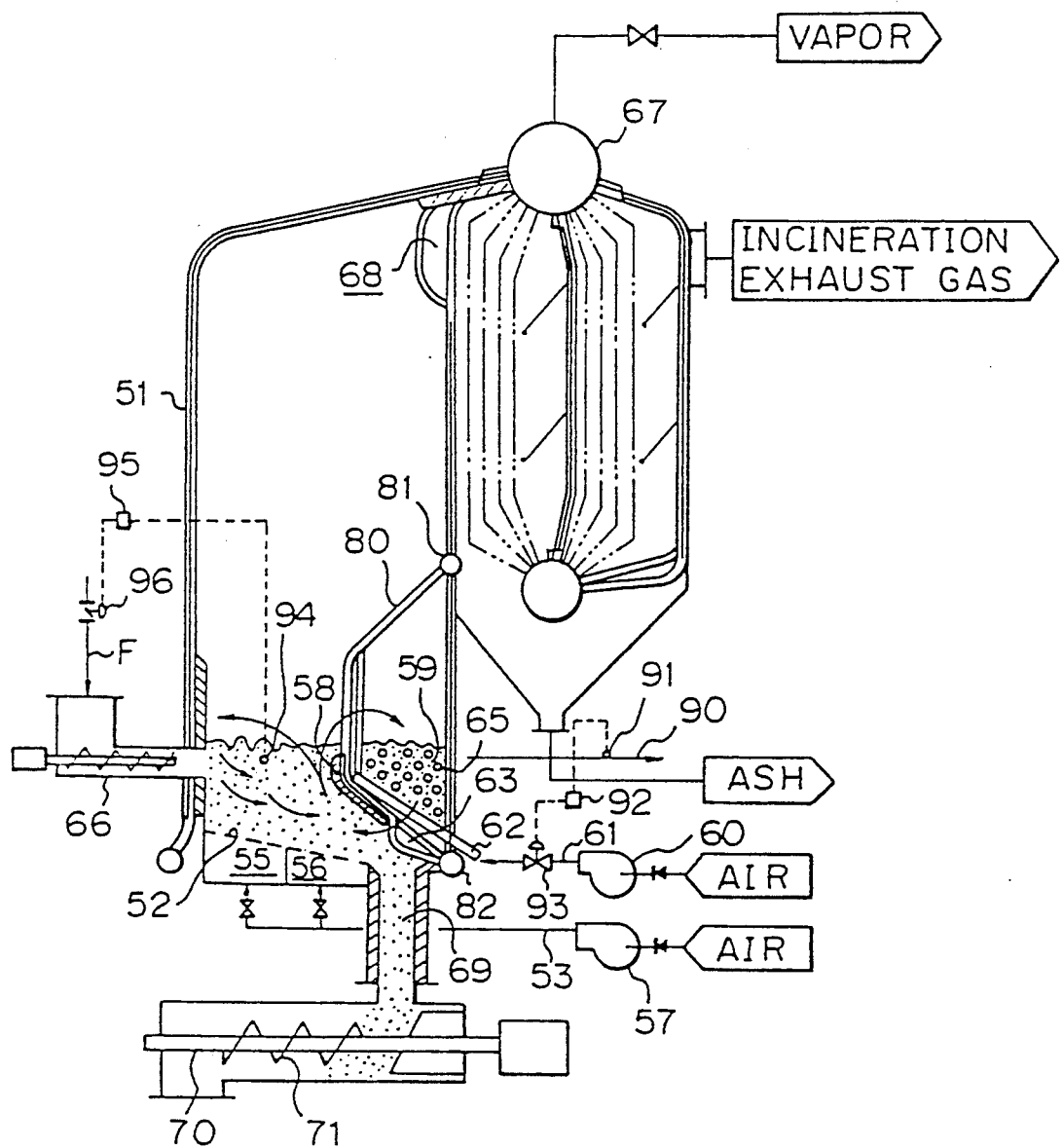
FIGS. 13 and 14 are sectional drawings explaining other embodiments of the internal recycling type fluidized bed boiler according to the present invention.

Incidentally, in the embodiments shown in FIGS. 4, 13 and 14, etc., it is preferable to arrange them in a rectangular configuration from the construction viewpoint.

We claim:

1. An internal recycling type fluidized bed boiler comprising:

a primary fluidized bed incinerating chamber constructed by an air diffusion plate provided at the bottom of an incinerator and adapted to inject fluidizing air upwardly under a mass flow that is at least greater at one side than that at another side;

an inclined partition wall provided above a portion of said diffusion plate where the mass flow is greater so as to interfere with the upward flow of the fluidizing air and thereby to deflect the air towards a portion above said another side of said diffusion plate where the mass flow is smaller;

a thermal energy recovery chamber formed between said inclined partition wall and a side wall of the incinerator or between the back sides of two inclined partition walls;

a heat exchanging surface means provided within said thermal energy recovery chamber for the passage of a heat sink fluid therethrough; and an air diffuser provided at a lower portion of said thermal energy recovery chamber and a back side of said inclined partition wall;

said thermal energy recovery chamber being communicated at upper and lower portions thereof with said primary fluidized bed incinerating chamber, said inclined partition wall being inclined by 10°-60° relative to the horizontal and the projection length thereof in the horizontal direction being 1/6-½ of the horizontal length of the incinerator bottom, a moving bed being formed above the portion of said diffusion plate where the injected mass flow is smaller so that a fluidizing medium descends and diffuses within the moving bed, and a circulating fluidized bed being formed above the portion of said diffusion plate where the mass flow of the fluidizing air is greater so that said fluidizing medium is actively fluidized and whirled towards a position above said moving bed and a part of said fluidizing medium being introduced into said thermal energy recovery chamber beyond an upper portion of said inclined partition wall, the formation of said moving bed and said circulating fluidized bed being effected by regulation of the amount of air injected upwardly from said diffusion plate and regulation of the fluidizing air injected from said diffuser in said thermal energy recovery chamber causing the fluidizing medium within said recovery chamber to descend in a state of a moving bed for circulation.

2. An internal recycling type fluidized bed boiler as claimed in claim 1, wherein the mass flow of the air injected from said diffuser at the bottom of said thermal energy recovery chamber is in the range of 0-3 Gmf, and the mass flow of the fluidizing air injected from said diffusion plate below said inclined partition wall is in the range of 4-20 Gmf.

3. An internal recycling type fluidized bed boiler as claimed in claim 1, wherein said inclined partition wall is inclined by 25°-45° relative to the horizontal.

4. An internal recycling type fluidized bed boiler as claimed in claim 1, wherein said inclined partition wall is inclined by 35° relative to the horizontal.

5. An internal recycling type fluidized bed boiler as claimed in claim 1, wherein said inclined partition wall is formed such that said length of its projection in the horizontal direction is $\frac{1}{4}$-$\frac{1}{2}$ of the horizontal length of said bottom of said incinerator.

6. A method of controlling an internal recycling type fluidized bed boiler constructed by comprising:
  a primary fluidized bed incinerating chamber constructed by an air diffusion plate provided at the bottom of an incinerator and adapted to inject fluidizing air upwardly under a mass flow that is at least greater at one side than that at another side;
  an inclined partition wall provided above a portion of said diffusion plate where the mass flow is greater so as to interfere with the upward flow of the fluidizing air and thereby to deflect the air towards a portion above said another side of said diffusion plate where the mass flow is smaller;
  a thermal energy recovery chamber formed between said inclined partition wall and a side wall of the incinerator or between the back sides of two inclined partition walls;
  a heat exchanging surface means provided within said thermal energy recovery chamber for the passage of a heat sink fluid therethrough; and
  an air diffuser provided at a lower portion of said thermal energy recovery chamber and a back side of said inclined partition wall;
  said thermal energy recovery chamber being communicated at upper and lower portions thereof with said primary fluidized bed incinerating chamber;
  said method comprising regulating the amount of air injected from said diffusion plate so that a moving bed is formed above the portion of said diffusion plate where the injected mass flow is smaller with a fluidizing medium descending and diffusing within said moving bed, and a circulating fluidized bed is formed above the portion of the diffusion plate where the mass flow of the fluidizing air is greater with said fluidizing medium being actively fluidized and circulated towards a position above said moving bed and a part of said fluidizing medium being introduced into said thermal energy recovery chamber beyond an upper portion of said inclined partition wall, the fluidizing air being injected from said diffuser in said recovery chamber so as to cause said fluidizing medium within said recovery chamber to descend and recycle in the state of a moving bed, controlling the amount of thermal energy recovered by said thermal energy recovery chamber by the regulation of the amount of gas injected from said diffuser in said recovery chamber based on demands from a user side utilizing generated vapor and hot water, and controlling the amount of fuel supplied to the primary fluidized bed incinerating chamber based on the temperature of said primary fluidized bed incinerating chamber.

7. A method of controlling the internal recycling type fluidized bed boilers as claimed in claim 6, wherein the mass flow of the air injected from said diffuser at a bottom of said thermal energy recovery chamber is in the range of 0-3 Gmf, and the mass flow of the fluidizing air injected from said diffusion plate below said inclined partition wall is in the range of 4-20 Gmf.

8. An internal recycling type fluidized bed boiler as claimed in claim 2, wherein the mass flow of the air injected from said diffuser at said bottom of said thermal energy recovery chamber is in the range of 0-2 Gmf, and the mass flow of the fluidizing air injected from said diffusion plate below said inclined partition wall is in the range of 6-12 Gmf.

9. A method controlling the internal recycling type fluidized bed boilers as claimed in claim 7, wherein the mass flow of the air injected from said diffuser at said bottom of said thermal energy recovery chamber is in the range of 0-2 Gmf, and the mass flow of the fluidizing air injected from said diffusion plate below said inclined partition wall is in the range of 6-12 Gmf.

10. A method of controlling a fluidized bed boiler, including an incinerator containing a primary fluidized bed of fluidizing medium and a diffusor means, a thermal energy recovery chamber containing a thermal recovery bed of fluidizing medium and an auxiliary diffusor means, an inclined partition wall separating said primary fluidized bed and said thermal recovery bed with said primary fluidized bed and said thermal recovery bed being in communication with each other at upper and lower ends thereof, a heat exchanging surface means provided within said thermal recovery bed for the passage of a fluid therethrough, said method comprising:
  supplying a fluidizing gas from said diffusor means at a higher mass flow rate to a region below said inclined partition wall than to a region opposite said partition wall, and thereby forming a rising bed at said inclined partition wall and a descending bed opposite said inclined partition wall, with said rising and descending beds forming a circulating bed;
  controlling the mass flow of said fluidizing gas from said diffusor means to said region of said inclined partition wall such that part of the fluidizing medium in said circulating bed flies upwardly and reaches said energy recovery chamber; and
  regulating the mass flow of a gas supplied by said auxiliary diffusor means to said thermal recovery bed, thereby controlling the overall coefficient of heat transfer and thus controlling the amount of thermal energy recovered by said fluid passing through said heat exchanging surface means.

11. The method of claim 10, comprising providing said diffusor means at the bottom of said incinerator.

12. The method of claim 10, comprising providing said thermal energy recovery chamber between said inclined partition wall and a side wall of said incinerator or between back sides of two inclined partition walls.

13. The method of claim 10, comprising providing said auxiliary diffusor being at a lower portion of said thermal energy recovery chamber and a back side of said inclined partition wall.

14. The method of claim 10, comprising providing said partition wall to be inclined by 10°–60° relative to the horizontal.

15. The method of claim 14, comprising providing said inclined partition wall to be inclined by 25°–45° relative to the horizontal.

16. The method of claim 10, comprising providing the projection length of said inclined partition wall in the horizontal direction to be 1/6–½ of the horizontal length of the bottom of said incinerator.

17. The method of claim 16, comprising providing said projection length to be ¼–½ of said horizontal length of said bottom of said incinerator.

18. The method as claimed in claim 10, comprising injecting said gas from said auxiliary diffusor means at the bottom of said thermal energy recovery chamber at a mass flow in the range of 0–3 Gmf, and injecting said fluidizing gas from said diffusor means below said inclined partition wall at a mass flow in the range of 4–20 Gmf.

19. The method as claimed in claim 16, wherein said mass flow of gas injected from said auxiliary diffusor means is in the range of 0–2 Gmf, and the mass flow of gas injected from said diffusor means below said inclined partition wall is 6–12 Gmf.

20. The method of claim 10, further comprising controlling the rate of flow of fuel to said incinerator.

21. The method of claim 20, comprising regulating the temperature in said primary fluidized bed by controlling the amount of said fuel charged thereto as a function of said temperature in said primary fluidized bed or of the vapor pressure.

22. The method of claim 20, comprising controlling the temperature of said primary fluidized bed within a predetermined range by regulating the amount of said fuel charged thereto and/or by regulating the amount of said gas supplied to said diffusor means.

23. The method of claim 22, comprising sensing the temperature of said primary fluidized bed by a thermosensor and conducting said regulating as a function of said sensed temperature.

24. The method of claims 20, comprising controlling the amount of said fuel fed to said primary fluidizing bed as a function of a pressure signal.

25. A fluidized bed boiler comprising:
an incinerator including a primary fluidized bed and a diffusor means for supplying thereto different amounts of a fluidizing gas;
a thermal energy recovery chamber including a thermal recovery bed and an auxiliary diffusor means for supplying thereto a gas;
an inclined partition wall separating said primary fluidized bed and said thermal recovery bed such that said primary fluidized bed and said thermal recovery bed are in communication with each other at upper and lower ends thereof;
heat exchanging surface means, provided within said thermal recovery bed, for the passage of a fluid therethrough;
said auxiliary diffusor means being located at a lower portion of said thermal energy recovery chamber, and said thermal recovery chamber having adjacent said lower portion thereof an opening to enable material of said thermal recovery bed to move downwardly through said opening from said thermal energy recovery chamber to said incinerator; and
a portion of said diffusor means being beneath said inclined partition wall and providing an upward mass flow of said fluidizing gas in the area of said inclined partition wall that is larger than the mass flow provided by other parts of said diffusor means.

26. The boiler of claim 25, wherein said diffusor means is positioned at a bottom of said incinerator.

27. The boiler of claim 25, wherein said thermal energy recovery chamber is formed between said inclined partition wall and a side wall of said incinerator or between back sides of two inclined partition walls.

28. The boiler of claim 25, wherein said auxiliary diffusor is positioned at a lower portion of said thermal energy recovery chamber and adjacent a back side of said inclined partition wall.

29. The boiler of claim 25, wherein said partition wall is inclined by 10°–60° relative to the horizontal.

30. The boiler of claim 29, wherein said inclined partition wall is inclined by 25°–45° relative to the horizontal.

31. The boiler of claim 25, wherein said inclined partition wall is formed such that the length of its protection in the horizontal direction is 1/6–½ of the horizontal length of the bottom of said incinerator.

32. The boiler of claim 31, wherein said inclined partition wall is formed such that said length of its projection in the horizontal direction is ¼–½ of the horizontal length of said bottom of said incinerator.

33. The boiler of claim 25, wherein the mass flow of the gas injected from said auxiliary diffusor means at a bottom of said thermal energy recovery chamber is in the range of 0–3 Gmf, and the mass flow of the fluidizing gas injected from said diffusor means to beneath said inclined partition wall is in the range of 4–20 Gmf.

34. The boiler of claim 33, wherein the mass flow of the gas injected from said auxiliary diffusor means at said bottom of said thermal energy recovery chamber is in the range of 0–2 Gmf, and the mass flow of the fluidizing gas injected from said diffusor means to below said inclined partition wall is in the range of 6–12 Gmf.

* * * * *

UNITED STATES PATENT AND TRADEMARK OFFICE
CERTIFICATE OF CORRECTION

PATENT NO.  : 5,138,982

DATED       : August 18, 1992

INVENTOR(S) : Takahiro OHSHITA et al.

It is certified that error appears in the above-identified patent and that said Letters Patent is hereby corrected as shown below:

On the Cover Page, under Section [63], line 1 thereof, "Jan. 4, 1991" should be --Jan. 4, 1990--.

Signed and Sealed this

Fourth Day of July, 1995

Attest:

BRUCE LEHMAN

Attesting Officer

Commissioner of Patents and Trademarks